United States Patent
Duke et al.

(10) Patent No.: US 9,594,907 B2
(45) Date of Patent: Mar. 14, 2017

(54) UNAUTHORIZED ACTIVITY DETECTION AND CLASSIFICATION

(71) Applicant: SAS Institute Inc., Cary, NC (US)

(72) Inventors: Brian Lee Duke, Poway, CA (US); Paul C. Dulany, San Diego, CA (US); Kannan Shashank Shah, San Diego, CA (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 15/043,012

(22) Filed: Feb. 12, 2016

(65) Prior Publication Data

US 2016/0283715 A1    Sep. 29, 2016

Related U.S. Application Data

(63) Continuation-in-part of application No. 14/062,062, filed on Oct. 24, 2013, now abandoned.

(60) Provisional application No. 61/782,537, filed on Mar. 14, 2013.

(51) Int. Cl.

| | |
|---|---|
| *G06F 11/00* | (2006.01) |
| *G06F 21/56* | (2013.01) |
| *G06N 99/00* | (2010.01) |
| *G06F 21/62* | (2013.01) |
| *G06Q 20/40* | (2012.01) |

(52) U.S. Cl.
CPC ........ *G06F 21/566* (2013.01); *G06F 21/6218* (2013.01); *G06N 99/005* (2013.01); *G06Q 20/4016* (2013.01); *G06F 2221/0735* (2013.01)

(58) Field of Classification Search
CPC ............... G06F 21/566; G06F 21/6218; G06F 2221/0735; G06N 99/005; G06Q 30/0255; G06Q 30/0261; G06Q 30/0269; G06Q 20/40; G06Q 40/00
USPC ..................................................... 726/22–25
See application file for complete search history.

(56) References Cited

U.S. PATENT DOCUMENTS

| | | |
|---|---|---|
| 5,335,291 A | 8/1994 | Kramer et al. |
| 5,500,513 A | 3/1996 | Langhans et al. |
| 5,519,319 A | 5/1996 | Smith et al. |
| 5,650,722 A | 7/1997 | Smith et al. |
| 5,675,253 A | 10/1997 | Smith et al. |
| 5,677,955 A | 10/1997 | Doggett et al. |
| 5,761,442 A | 6/1998 | Barr et al. |
| 5,819,226 A | 10/1998 | Gopinathan et al. |
| 5,884,289 A | 3/1999 | Anderson et al. |
| 5,903,830 A | 5/1999 | Joao et al. |
| 5,999,596 A | 12/1999 | Walker et al. |
| 6,014,645 A | 1/2000 | Cunningham |

(Continued)

OTHER PUBLICATIONS

Brause, Rudiger W., "Cascaded Vector Quantization by Non-Linear PCA Network Layers," IEEE, pp. 154-160 (1994).

(Continued)

*Primary Examiner* — Mohammed Waliullah
(74) *Attorney, Agent, or Firm* — Kilpatrick Townsend & Stockton LLP

(57) ABSTRACT

Systems and methods are provided for identifying and detecting unauthorized user activity and for decreasing the rate of false-positives. The disclosed systems and techniques may involve analysis of users' past activity data so that individual classifications and authorization decisions with respect to requested user activity are based on activity data associated with a user's use of multiple services.

30 Claims, 19 Drawing Sheets

(56) References Cited

U.S. PATENT DOCUMENTS

| | | | |
|---|---|---|---|
| 6,021,943 A | 2/2000 | Chastain | |
| 6,029,154 A | 2/2000 | Pettitt | |
| 6,047,268 A | 4/2000 | Bartoli et al. | |
| 6,064,990 A | 5/2000 | Goldsmith | |
| 6,122,624 A | 9/2000 | Tetro et al. | |
| 6,125,349 A | 9/2000 | Maher | |
| 6,128,602 A | 10/2000 | Northington et al. | |
| 6,170,744 B1 | 1/2001 | Lee et al. | |
| 6,330,546 B1 | 12/2001 | Gopinathan et al. | |
| 6,360,326 B1 | 3/2002 | Hiles | |
| 6,388,592 B1 | 5/2002 | Natarajan | |
| 6,401,198 B1 | 6/2002 | Harmer et al. | |
| 6,405,318 B1* | 6/2002 | Rowland | G06F 21/552 726/22 |
| 6,422,462 B1 | 7/2002 | Cohen | |
| 6,453,206 B1 | 9/2002 | Soraghan et al. | |
| 6,516,056 B1 | 2/2003 | Justice et al. | |
| 6,549,861 B1 | 4/2003 | Mark et al. | |
| 6,601,049 B1 | 7/2003 | Cooper | |
| 6,631,212 B1 | 10/2003 | Luo et al. | |
| 6,640,215 B1 | 10/2003 | Galperin et al. | |
| 6,650,779 B2 | 11/2003 | Vachtesvanos et al. | |
| 6,675,145 B1 | 1/2004 | Yehia et al. | |
| 6,678,640 B2 | 1/2004 | Ishida et al. | |
| 6,714,918 B2 | 3/2004 | Hillmer et al. | |
| 6,901,398 B1 | 5/2005 | Horvitz et al. | |
| 6,952,682 B1 | 10/2005 | Wellman | |
| 6,954,758 B1 | 10/2005 | O'Flaherty | |
| 7,117,191 B2 | 10/2006 | Gavan et al. | |
| 7,165,037 B2 | 1/2007 | Lazarus et al. | |
| 7,191,150 B1 | 3/2007 | Shao et al. | |
| 7,269,516 B2 | 9/2007 | Brunner et al. | |
| 7,376,431 B2 | 5/2008 | Niedermeyer | |
| 7,376,618 B1 | 5/2008 | Anderson et al. | |
| 7,403,922 B1 | 7/2008 | Lewis et al. | |
| 7,455,226 B1 | 11/2008 | Hammond et al. | |
| 7,461,048 B2 | 12/2008 | Teverovskiy et al. | |
| 7,467,119 B2 | 12/2008 | Saidi et al. | |
| 7,480,640 B1 | 1/2009 | Elad et al. | |
| 7,536,348 B2 | 5/2009 | Shao et al. | |
| 7,562,058 B2 | 7/2009 | Pinto et al. | |
| 7,580,798 B2 | 8/2009 | Brunner et al. | |
| 7,761,379 B2 | 7/2010 | Zoldi et al. | |
| 7,765,148 B2 | 7/2010 | German et al. | |
| 7,788,195 B1 | 8/2010 | Subramanian et al. | |
| 7,912,773 B1 | 3/2011 | Subramanian et al. | |
| 8,032,448 B2 | 10/2011 | Anderson et al. | |
| 8,104,678 B2 | 1/2012 | Yoshikawa et al. | |
| 8,346,691 B1 | 1/2013 | Subramanian et al. | |
| 8,412,605 B2 | 4/2013 | Griffin et al. | |
| 8,775,231 B1 | 7/2014 | Nipko et al. | |
| 8,843,395 B2 | 9/2014 | Ramer et al. | |
| 8,890,676 B1* | 11/2014 | Heath | G08B 29/188 340/3.1 |
| 9,231,979 B2 | 1/2016 | Duke et al. | |
| 2001/0056379 A1 | 12/2001 | Fujinaga et al. | |
| 2002/0099635 A1 | 7/2002 | Guiragosian | |
| 2002/0107797 A1 | 8/2002 | Combaluzier | |
| 2002/0138417 A1 | 9/2002 | Lawrence | |
| 2002/0194119 A1 | 12/2002 | Wright et al. | |
| 2003/0093366 A1 | 5/2003 | Halper et al. | |
| 2003/0097330 A1 | 5/2003 | Hillmer et al. | |
| 2004/0039688 A1 | 2/2004 | Sulkowski et al. | |
| 2004/0199445 A1 | 10/2004 | Eder | |
| 2005/0055373 A1 | 3/2005 | Forman | |
| 2005/0131873 A1 | 6/2005 | Fan et al. | |
| 2005/0222928 A1 | 10/2005 | Steier et al. | |
| 2005/0278192 A1 | 12/2005 | Cantini et al. | |
| 2006/0020814 A1 | 1/2006 | Lieblich et al. | |
| 2006/0181411 A1 | 8/2006 | Fast et al. | |
| 2006/0218169 A1 | 9/2006 | Steinberg et al. | |
| 2007/0192167 A1 | 8/2007 | Lei et al. | |
| 2007/0219817 A1 | 9/2007 | Wu | |
| 2007/0239606 A1 | 10/2007 | Eisen et al. | |
| 2008/0059474 A1* | 3/2008 | Lim | G06F 17/3089 |
| 2008/0126556 A1 | 5/2008 | Perng et al. | |
| 2008/0134236 A1 | 6/2008 | Iijima et al. | |
| 2009/0234683 A1 | 9/2009 | Anderson et al. | |
| 2010/0043047 A1* | 2/2010 | Archer | H04L 63/1416 726/1 |
| 2011/0173116 A1* | 7/2011 | Yan | G06Q 10/067 705/38 |
| 2012/0317008 A1 | 12/2012 | Subramanian et al. | |
| 2012/0317013 A1 | 12/2012 | Luk et al. | |
| 2012/0317027 A1 | 12/2012 | Luk et al. | |
| 2013/0024300 A1* | 1/2013 | Choudhuri | G06Q 40/02 705/16 |
| 2014/0089044 A1 | 3/2014 | Nipko et al. | |
| 2015/0026719 A1 | 1/2015 | Menon | |
| 2015/0121518 A1* | 4/2015 | Shmueli | H04L 63/1425 726/22 |

OTHER PUBLICATIONS

Chan, Lipchen Alex et al., Automatic target detection dualband infrared imager, Acoustics, Speech, and Signal PICASSP'00 Proceedings, 2000 IEEE International Conference, pp. 2286-2289 (Jun. 9, 2000).

Chatterjee, Chanchal et al., "Self-Organizing Algorithms for Generalized Eigen-Decomposition," IEEE Transactions on Neural Networks, vol. 8, No. 6, pp. 1518-1530 (Nov. 1997).

Chen, Yupeng et al., "High Resolution Adaptive Bearing Estimation Using a Complex-Weighted Neural Network," IEEE, 0-7803-0532-9/92, pp. II 317-II 320 (1992).

Gabrys, Bogdan et al., "Combining labelled and unlabelled data in the design of pattern classification systems," International Journal of Approximate Reasoning 35, pp. 251-273, (2004).

Gunter, Simon, "Multiple Classifier Systems in Offline Cursive Handwriting Recognition," der Universistät Bern, 2 pages (2004).

Hawkins, Simon et al., "Outlier Detection Using Replicator Neural Networks," CSIRO Mathematical and Information Sciences, Canberra ACT 2601, Australia, 10 pages, (2002).

Lazarevic, Aleksandar et al., "Feature Bagging for Outlier Detection," United Technologies Research Center, University of Minnesota, pp. 157-166 (2005).

Mehrotra, Krishan et al., "Elements of Artificial Neutral Networks," MIT Pres, pp. 11, 25, 71, 76, 85-87, 157, 170-171 (1997).

Tsai, Chieh-Yuan, et al., "A Dynamic Web based Data Mining Process System," Proceedings of the 2005 The Fifth International Conference on Computer and Information Technology, pp. 1033-1039 (2005).

West, David et al., "Neural network ensemble strategies for financial decision applications," Computer & Operations Research 32, pp. 2543-2559 (2004).

Wong, A.S. Y. et al., "A Unified Sequential Method for PCA," IEEE, pp. 583-586 (1999).

Zhang, Tiezhu et al., "Study on the Application of Dynamic Balanced Scorecard in the Service Industry," 2008 International Conference on Intelligent Computation Technology and Automation, Digital Object Identifier: 10.1109/ICICTA.2008.359, pp. 1158-1162 (2008).

Hinterseer, K. The Wolfsberg Anti-money Laundering Principles, Journal of Money Laundering Control vol. 5 (1), pp. 25-41, (Summer 2001).

Miyazaki, A.D., and Fernanderz, A. "Internet Privacy and Security: An Examiniation of Online Retailer Disclosures," Journal of Public Policy & Marketing vol. 19 (1), pp. 54-61 (Spring 2000).

Automated Clearing House, Bank of America Merrill Lynch, downloaded on Mar. 18, 2013 from http://corp.bankofamerica.com/business/ci/landing/ach 3 pages.

Eastern Bank ACH User Guide downloaded on Mar. 18, 2013 from https://www.easternbank.com/SiteCollectionDocuments/PDFs/tc_ach_guide.pdf 25 pages.

NACHA Layout Spec downloaded on Mar. 18, 2013 from http://www.regaltek.com/docs/NACHA%20Format.pdf 14 pages.

Non Final Office Action of Apr. 30, 2015 for U.S. Appl. No. 14/062,062, 18 pages.

(56) References Cited

OTHER PUBLICATIONS

Non Final Office Action of May 20, 2015 for U.S. Appl. No. 14/210,314, 18 pages.
Non Final Office Action of Dec. 8, 2015 for U.S. Appl. No. 14/062,062, 25 pages.
Notice of Allowance of Nov. 12, 2015 for U.S. Appl. No. 14/210,314, 14 pages.
Ishibuchi et al. "Selecting Fuzzy If-Then Rules for Classification Problems Using Generic Algorithms" IEEETransaction on Fuzzy Systems, vol. 3, No. 3 (Aug. 1995) 11 pages.

* cited by examiner

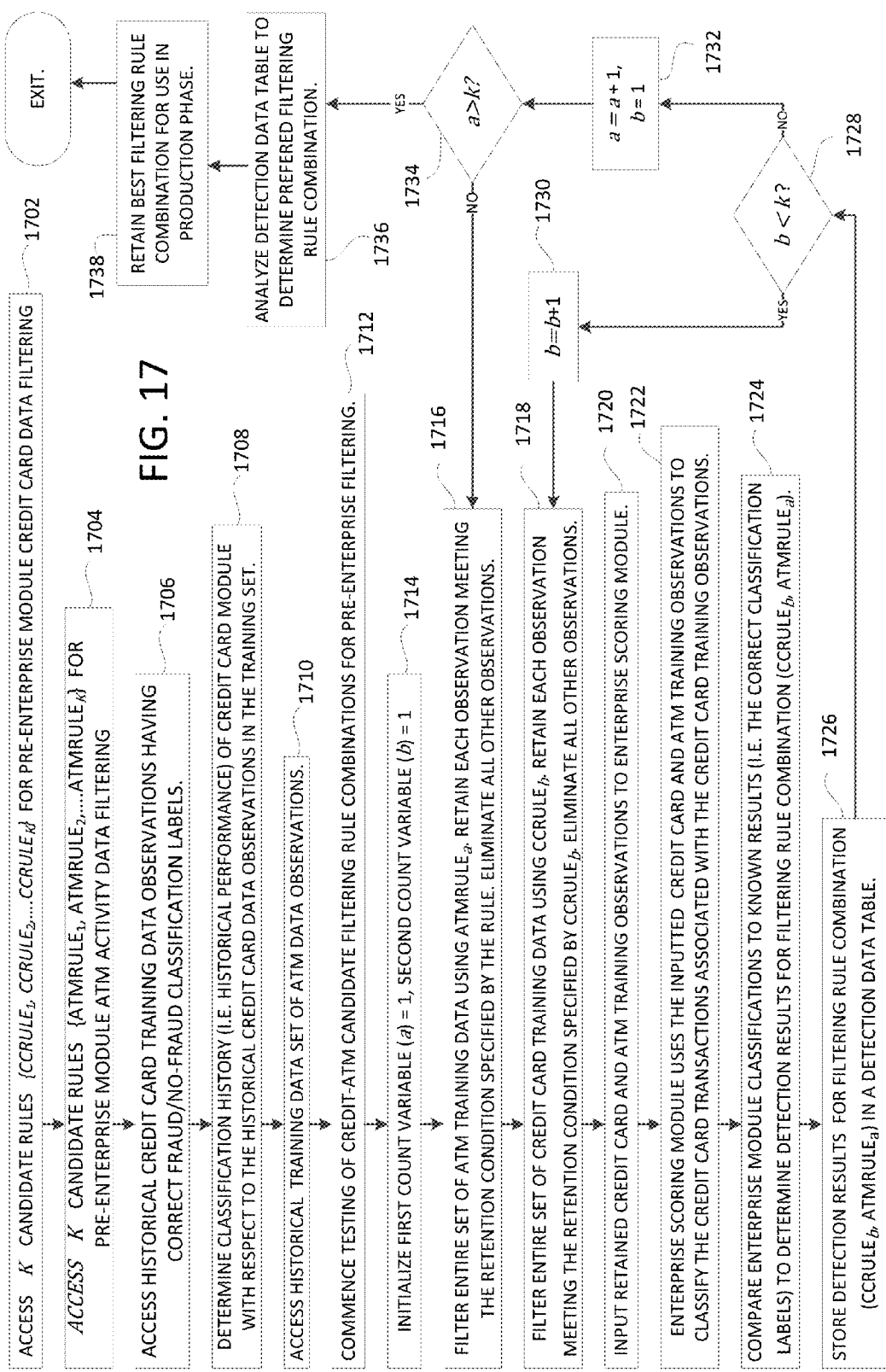

| Credit Card Activity Request Filtering Rule | Supplemental ATM Filtering Rule | A | B | C | D | E | F | G | H | I | J | K | L | TOTAL NEGATIVES IN TRAINING DATA | TOTAL POSITIVES IN TRAINING DATA | TRUE POSITIVE DETECTION RATE | FALSE POSITIVE DETECTION RATE |
|---|---|---|---|---|---|---|---|---|---|---|---|---|---|---|---|---|---|
| CCRULE₁ | ATMRULE₁ | 10 | 590 | 220 | 30 | 30 | 600 | 880 | 700 | 1200 | 300 | 320 | 1120 | 4500 | 1500 | 76% | 38.4% |
| CCRULE₁ | ATMRULE₂ | 10 | 730 | 230 | 40 | 30 | 500 | 330 | 790 | 1140 | 250 | 450 | 1500 | 4500 | 1500 | 78.7% | 44.6% |
| CCRULE₁ | ATMRULE₃ | 20 | 700 | 190 | 100 | 10 | 500 | 280 | 630 | 1420 | 230 | 470 | 1450 | 4500 | 1500 | 77.3% | 43.7% |
| CCRULE₂ | ATMRULE₁ | 10 | 600 | 200 | 150 | 30 | 450 | 100 | 490 | 1700 | 200 | 470 | 1600 | 4500 | 1500 | 74.6% | 45.7% |
| CCRULE₂ | ATMRULE₂ | 10 | 880 | 260 | 90 | 40 | 500 | 150 | 470 | 1450 | 260 | 350 | 1540 | 4500 | 1500 | 74% | 45.5% |
| CCRULE₂ | ATMRULE₃ | 20 | 820 | 130 | 150 | 30 | 480 | 380 | 490 | 1490 | 300 | 410 | 1300 | 4500 | 1500 | 68% | 40% |
| CCRULE₃ | ATMRULE₁ | 20 | 1500 | 150 | 130 | 30 | 430 | 110 | 460 | 1460 | 310 | 450 | 950 | 4500 | 1500 | 68.6% | 31.1% |

Annotations:
- 76% / 38.4%: POSSIBLY A GOOD BALANCE BETWEEN TRUE POSITIVE PERFORMANCE AND FALSE POSITIVE ERROR RATE.
- 78.7% / 44.6%: BEST TRUE POSITIVE PERFORMANCE, BUT VERY SENSITIVE TO FALSE POSITIVES ERRORS.
- 68.6% / 31.1%: POSSIBLY A GOOD RULE COMBINATION FOR USER VERY CONCERNED ABOUT FALSE POSITIVES TRUE POSITIVE DETECTION RATE = (TOTAL TRUE POSITIVE CLASSIFICATIONS/TOTAL POSITIVES IN TRAINING DATA)*100%
FALSE POSITIVE DETECTION RATE = (TOTAL FALSE POSITIVE CLASSIFICATIONS/TOTAL NEGATIVES IN TRAINING DATA)*100%

A = CREDIT CARD MODULE TRUE NEGATIVE & ENTERPRISE MODULE FALSE POSITIVE, FINAL RESULT = FALSE POSITIVE
B = CREDIT CARD MODULE TRUE NEGATIVE & ENTERPRISE MODULE TRUE NEGATIVE, FINAL RESULT = TRUE NEGATIVE
C = CREDIT CARD MODULE FALSE NEGATIVE & ENTERPRISE MODULE TRUE POSITIVE, FINAL RESULT = TRUE POSITIVE
D = CREDIT CARD MODULE FALSE NEGATIVE & ENTERPRISE MODULE FALSE NEGATIVE, FINAL RESULT = FALSE NEGATIVE
E = CREDIT CARD MODULE TRUE POSITIVE & ENTERPRISE MODULE FALSE NEGATIVE, FINAL RESULT = FALSE NEGATIVE
F = CREDIT CARD MODULE TRUE POSITIVE & ENTERPRISE MODULE TRUE POSITIVE, FINAL RESULT = TRUE POSITIVE
G = CREDIT CARD MODULE FALSE POSITIVE & ENTERPRISE MODULE FALSE POSITIVE, FINAL RESULT = FALSE POSITIVE
H = CREDIT CARD MODULE FALSE POSITIVE & ENTERPRISE MODULE TRUE NEGATIVE, FINAL RESULT = TRUE NEGATIVE
I = CREDIT CARD MODULE TRUE NEGATIVE & ENTERPRISE MODULE NOT EXAMINED, FINAL RESULT = TRUE NEGATIVE
J = CREDIT CARD MODULE FALSE NEGATIVE & ENTERPRISE MODULE NOT EXAMINED, FINAL RESULT = FALSE NEGATIVE
K = CREDIT CARD MODULE TRUE POSITIVE & ENTERPRISE MODULE NOT EXAMINED, FINAL RESULT = TRUE POSITIVE
L = CREDIT CARD MODULE FALSE POSITIVE & ENTERPRISE MODULE NOT EXAMINED, FINAL RESULT = FALSE POSITIVE

FIG. 18

| SEQUENCE | CREDIT CARD MODULE CLASSIFICATION | INITIAL SECURITY ACTION | FILTER DETERMINATION | ENTERPRISE MODULE CLASSIFICATION | ULTIMATE CLASSIFICATION | SECOND SECURITY ACTION |
|---|---|---|---|---|---|---|
| 1 | AUTHORIZED | ALLOW TRANSACTION/ DO NOT IMPOSE ANY SECURITY MEASURES | PROVIDE FOR REEVALUATION | UNAUTHORIZED | UNAUTHORIZED | IMPOSE STRONGER SECURITY MEASURES |
| 2 | AUTHORIZED | ALLOW TRANSACTION/ DO NOT IMPOSE ANY SECURITY MEASURES | PROVIDE FOR REEVALUATION | AUTHORIZED | AUTHORIZED | NO SECURITY MEASURES |
| 3 | AUTHORIZED | ALLOW TRANSACTION/ DO NOT IMPOSE ANY SECURITY MEASURES | DO NOT PROVIDE FOR REEVALUATION | NONE | AUTHORIZED | NO SECURITY MEASURES |
| 4 | UNAUTHORIZED | DECLINE TRANSACTION/ IMPOSE BASIC SECURITY MEASURES | PROVIDE FOR REEVALUATION | UNAUTHORIZED | UNAUTHORIZED | INCREASE TO STRONG OR STRONGEST SECURITY MEASURES |
| 5 | UNAUTHORIZED | DECLINE TRANSACTION/ IMPOSE BASIC SECURITY MEASURES | PROVIDE FOR REEVALUATION | AUTHORIZED | AUTHORIZED | DEACTIVATE/ DISCONTINUE BASIC SECURITY MEASURES |
| 6 | UNAUTHORIZED | DECLINE TRANSACTION/ IMPOSE BASIC SECURITY MEASURES | DO NOT PROVIDE FOR REEVALUATION | NONE | UNAUTHORIZED | INCREASE SECURITY MEASURES TO STRONGEST LEVEL |

FIG. 19

ID ACTIVITY DETECTION
AND CLASSIFICATION

SUMMARY

In accordance with the teachings herein, systems and methods are provided for identifying and detecting unauthorized user activity and for decreasing the rate of false-positives. The disclosed systems and techniques may involve analysis of users' past activity data, such as may be associated with one or more access control devices, so that individual classifications and authorization decisions with respect to requested user activity are based on activity data associated with a user's use of multiple services, which may aid in detecting lost or stolen access control devices.

For example, in one aspect, a system is disclosed. In an embodiment, a system of this aspect comprises one or more processors; one or more non-transitory computer-readable storage mediums including instructions configured to cause the one or more processors to perform operations including: generating a filtering rule; partitioning training data using the filtering rule, wherein the training data includes past data representing unauthorized activity; analyzing a set of partitions, wherein analyzing includes providing the set of partitions to a model, wherein the model repeatedly generates a set of classifications, and wherein a classification is associated with a partition; accessing known information associated with the training data; identifying an accurate set of classifications using the known information, wherein the accurate set of classifications is associated with the analyzed set of partitions; accessing first data that represents activity involving a first service provided to a user; accessing second data that represents activity involving a second service provided to a user, wherein the activity involving the second service and the activity involving the first service both include authorized user activity, and wherein the activity associated with the second service further includes unauthorized activity; filtering, on a computing device, a portion of the first data for use in classifying activity associated with the second service, wherein filtering the portion of the first data includes using the filtering rule and the accurate set of classifications; determining a retained portion of the first data, wherein the retained portion of the first data is separate from the filtered portion of the first data; and analyzing the second data and the retained portion of the first data, wherein analyzing includes classifying the activity associated with the second service, and wherein classifying distinguishes the unauthorized activity from the authorized activity associated with the second service.

Optionally, analyzing the second data and the retained portion of the first data further includes determining that the retained portion of the first data indicates that activity involving the first service occurred at a first location; determining that the second data indicates that activity involving the second service occurred at a second location; determining a distance between the first location and the second location; and determining that the distance is greater than a distance threshold. Optionally, analyzing the second data and the retained portion of the first data further includes determining an approximate amount of time between the activity at the first location and the activity at the second location, and wherein the activity at the second location is classified based on the amount of time. Optionally, analyzing the second data and the retained portion of the first data further includes determining that the second data represents a first instance of abnormal activity involving the second service; detecting an inconsistency between the first instance of abnormal activity and activity represented by the first data; and determining, based on the detected inconsistency, that the first instance of abnormal activity is unauthorized activity.

Optionally, detecting the inconsistency includes determining that the user is unlikely to have initiated both the abnormal activity and the activity indicated by the first data.

Optionally, the operations further include determining that the second data represents an instance of abnormal activity involving the second service; detecting activity that is represented by the first data and is consistent with the instance of abnormal activity; and in response to detecting the activity that is consistent, classifying the abnormal activity involving the second service as authorized activity.

Optionally, the retained portion of the first data is a subset of the first data, and wherein the filtering rule is associated with a condition satisfied by data in the retained portion.

Optionally, the set of classifications are associated with multiple instances of activity involving the second service.

Optionally, the operations further include determining a filtering criteria based on past information about authorized or unauthorized activity involving the second service. Optionally, determining the filtering criteria includes defining the filtering criteria to facilitate identifying a portion of the first data that is inconsistent with the second data; or identifying a portion of the first data that is consistent with the second data.

Optionally, the operations further include providing the first data to a detection mechanism prior to filtering the first data, wherein the detection mechanism is configured to detect unauthorized activity involving the first service without processing information about user activity involving the second service. Optionally, the filtering criteria are defined based on known detection characteristics, capabilities, or vulnerabilities of the detection mechanism.

Optionally, the detection mechanism scores components of the first data, wherein scoring includes calculating a likelihood that the scored component corresponds to unauthorized activity, and wherein filtering the first data is further based on the detection mechanism scoring.

Optionally, wherein the second data is a subset of a data superset, wherein the data superset comprises information representing activity involving the second service, and wherein accessing the second data includes filtering the data superset, wherein filtering the data superset is performed using second data filtering criteria, and includes determining to classify activity represented by the second data.

Optionally, the second data filtering criteria are for separating a subset of data from a data superset, wherein the subset is likely to be more informative for detecting unauthorized activity as compared to a portion of data that is in the data superset but which is not in the separated subset.

Optionally, the first data represents multiple instances of activity involving the first service, wherein the first data includes multiple first data components, and wherein each first data component represents a unique one of the multiple instances of activity involving the first service.

Optionally, filtering the first data includes identifying first data components that represent an instance of activity associated with an amount transacted that is in excess of a predetermined threshold amount; an instance of activity which is abnormal activity for the user; an instance of activity determined to have occurred more than a threshold distance from a residence of the user; or an instance of activity determined to have occurred more than a threshold distance from a location at which a previous instance of activity occurred; and wherein the retained portion of first data includes the identified first data components.

Optionally, filtering the first data further includes assigning a score to each of the first data components. Optionally, filtering the first data is done without consideration of the second data. Optionally, filtering the first data includes using a machine-learning algorithm to filter the first data, and wherein using the machine-learning algorithm includes training with past data representing unauthorized activity involving the first service or the second service.

In another aspect, method for detecting an unauthorized activity are provided. In embodiments, a method of this aspect comprises generating a filtering rule; partitioning training data using the filtering rule, wherein the training data includes past data representing unauthorized activity; analyzing a set of partitions, wherein analyzing includes providing the set of partitions to a model, wherein the model repeatedly generates a set of classifications, and wherein a classification is associated with a partition; accessing known information associated with the training data; identifying an accurate set of classifications using the known information, wherein the accurate set of classifications is associated with the analyzed set of partitions; accessing first data that represents activity involving a first service provided to a user; accessing second data that represents activity involving a second service provided to a user, wherein the activity involving the second service and the activity involving the first service both include authorized user activity, and wherein the activity associated with the second service further includes unauthorized activity; filtering, on a computing device, a portion of the first data for use in classifying activity associated with the second service, wherein filtering the portion of the first data includes using the filtering rule and the accurate set of classifications; determining a retained portion of the first data, wherein the retained portion of the first data is separate from the filtered portion of the first data; and analyzing the second data and the retained portion of the first data, wherein analyzing includes classifying the activity associated with the second service, and wherein classifying distinguishes the unauthorized activity from the authorized activity associated with the second service.

Optionally, analyzing the second data and the retained portion of the first data further includes determining that the retained portion of the first data indicates that activity involving the first service occurred at a first location; determining that the second data indicates that activity involving the second service occurred at a second location; determining a distance between the first location and the second location; and determining that the distance is greater than a distance threshold.

Optionally, analyzing the second data and the retained portion of the first data further includes determining an approximate amount of time between the activity at the first location and the activity at the second location, and wherein the activity at the second location is classified based on the amount of time.

Optionally, analyzing the second data and the retained portion of the first data further includes determining that the second data represents a first instance of abnormal activity involving the second service; detecting an inconsistency between the first instance of abnormal activity and activity represented by the first data; and determining, based on the detected inconsistency, that the first instance of abnormal activity is unauthorized activity.

Optionally, detecting the inconsistency includes determining that the user is unlikely to have initiated both the abnormal activity and the activity indicated by the first data.

Optionally, a method of this aspect further comprises determining that the second data represents an instance of abnormal activity involving the second service; detecting activity that is represented by the first data and is consistent with the instance of abnormal activity; and in response to detecting the activity that is consistent, classifying the abnormal activity involving the second service as authorized activity.

Optionally, the retained portion of the first data is a subset of the first data, and wherein the filtering rule is associated with a condition satisfied by data in the retained portion. Optionally, the set of classifications are associated with multiple instances of activity involving the second service.

Optionally, a method of this aspect further comprises determining a filtering criteria based on past information about authorized or unauthorized activity involving the second service.

Optionally, determining the filtering criteria includes defining the filtering criteria to facilitate identifying a portion of the first data that is inconsistent with the second data; or identifying a portion of the first data that is consistent with the second data.

Optionally, a method of this aspect, further comprises providing the first data to a detection mechanism prior to filtering the first data, wherein the detection mechanism is configured to detect unauthorized activity involving the first service without processing information about user activity involving the second service.

Optionally, the filtering criteria are defined based on known detection characteristics, capabilities, or vulnerabilities of the detection mechanism. Optionally, the detection mechanism scores components of the first data, wherein scoring includes calculating a likelihood that the scored component corresponds to unauthorized activity, and wherein filtering the first data is further based on the detection mechanism scoring.

Optionally, the second data is a subset of a data superset, wherein the data superset comprises information representing activity involving the second service, and wherein accessing the second data includes filtering the data superset, wherein filtering the data superset is performed using second data filtering criteria, and includes determining to classify activity represented by the second data.

Optionally, the second data filtering criteria are for separating a subset of data from a data superset, wherein the subset is likely to be more informative for detecting unauthorized activity as compared to a portion of data that is in the data superset but which is not in the separated subset.

Optionally, the first data represents multiple instances of activity involving the first service, wherein the first data includes multiple first data components, and wherein each first data component represents a unique one of the multiple instances of activity involving the first service.

Optionally, filtering the first data includes identifying first data components that represent an instance of activity associated with an amount transacted that is in excess of a predetermined threshold amount; an instance of activity which is abnormal activity for the user; an instance of activity determined to have occurred more than a threshold distance from a residence of the user; or an instance of activity determined to have occurred more than a threshold distance from a location at which a previous instance of activity occurred; and wherein the retained portion of first data includes the identified first data components.

Optionally, filtering the first data further includes assigning a score to each of the first data components. Optionally, filtering the first data is done without consideration of the second data.

Optionally, filtering the first data includes using a machine-learning algorithm to filter the first data, and wherein using the machine-learning algorithm includes training with past data representing unauthorized activity involving the first service or the second service.

In another aspect, computer-program products are provided, such as computer program products tangibly embodied in a machine-readable non-transitory storage medium. In one example, a computer program product of this aspect comprises instructions configured to cause a data processing apparatus to perform operations including generating a filtering rule; partitioning training data using the filtering rule, wherein the training data includes past data representing unauthorized activity; analyzing a set of partitions, wherein analyzing includes providing the set of partitions to a model, wherein the model repeatedly generates a set of classifications, and wherein a classification is associated with a partition; accessing known information associated with the training data; identifying an accurate set of classifications using the known information, wherein the accurate set of classifications is associated with the analyzed set of partitions; accessing first data that represents activity involving a first service provided to a user; accessing second data that represents activity involving a second service provided to a user, wherein the activity involving the second service and the activity involving the first service both include authorized user activity, and wherein the activity associated with the second service further includes unauthorized activity; filtering, on a computing device, a portion of the first data for use in classifying activity associated with the second service, wherein filtering the portion of the first data includes using the filtering rule and the accurate set of classifications; determining a retained portion of the first data, wherein the retained portion of the first data is separate from the filtered portion of the first data; and analyzing the second data and the retained portion of the first data, wherein analyzing includes classifying the activity associated with the second service, and wherein classifying distinguishes the unauthorized activity from the authorized activity associated with the second service.

Optionally, analyzing the second data and the retained portion of the first data further includes determining that the retained portion of the first data indicates that activity involving the first service occurred at a first location; determining that the second data indicates that activity involving the second service occurred at a second location; determining a distance between the first location and the second location; and determining that the distance is greater than a distance threshold.

Optionally, analyzing the second data and the retained portion of the first data further includes determining an approximate amount of time between the activity at the first location and the activity at the second location, and wherein the activity at the second location is classified based on the amount of time.

Optionally, analyzing the second data and the retained portion of the first data further includes determining that the second data represents a first instance of abnormal activity involving the second service; detecting an inconsistency between the first instance of abnormal activity and activity represented by the first data; and determining, based on the detected inconsistency, that the first instance of abnormal activity is unauthorized activity.

Optionally, detecting the inconsistency includes determining that the user is unlikely to have initiated both the abnormal activity and the activity indicated by the first data.

Optionally, the operations further include determining that the second data represents an instance of abnormal activity involving the second service; detecting activity that is represented by the first data and is consistent with the instance of abnormal activity; and in response to detecting the activity that is consistent, classifying the abnormal activity involving the second service as authorized activity.

Optionally, the retained portion of the first data is a subset of the first data, and wherein the filtering rule is associated with a condition satisfied by data in the retained portion. Optionally, the set of classifications are associated with multiple instances of activity involving the second service.

Optionally, the operations further include determining a filtering criteria based on past information about authorized or unauthorized activity involving the second service. Optionally, determining the filtering criteria includes defining the filtering criteria to facilitate identifying a portion of the first data that is inconsistent with the second data; or identifying a portion of the first data that is consistent with the second data.

Optionally, the operations further include providing the first data to a detection mechanism prior to filtering the first data, wherein the detection mechanism is configured to detect unauthorized activity involving the first service without processing information about user activity involving the second service.

Optionally, the filtering criteria are defined based on known detection characteristics, capabilities, or vulnerabilities of the detection mechanism. Optionally, the detection mechanism scores components of the first data, wherein scoring includes calculating a likelihood that the scored component corresponds to unauthorized activity, and wherein filtering the first data is further based on the detection mechanism scoring.

Optionally, the second data is a subset of a data superset, wherein the data superset comprises information representing activity involving the second service, and wherein accessing the second data includes filtering the data superset, wherein filtering the data superset is performed using second data filtering criteria, and includes determining to classify activity represented by the second data.

Optionally, the second data filtering criteria are for separating a subset of data from a data superset, wherein the subset is likely to be more informative for detecting unauthorized activity as compared to a portion of data that is in the data superset but which is not in the separated subset.

Optionally, the first data represents multiple instances of activity involving the first service, wherein the first data includes multiple first data components, and wherein each first data component represents a unique one of the multiple instances of activity involving the first service.

Optionally, filtering the first data includes identifying first data components that represent an instance of activity associated with an amount transacted that is in excess of a predetermined threshold amount; an instance of activity which is abnormal activity for the user; an instance of activity determined to have occurred more than a threshold distance from a residence of the user; or an instance of activity determined to have occurred more than a threshold distance from a location at which a previous instance of activity occurred; and wherein the retained portion of first data includes the identified first data components.

Optionally, filtering the first data further includes assigning a score to each of the first data components. Optionally, filtering the first data is done without consideration of the second data.

Optionally, filtering the first data includes using a machine-learning algorithm to filter the first data, and wherein using the machine-learning algorithm includes training with past data representing unauthorized activity involving the first service or the second service.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

The present disclosure is described in conjunction with the appended figures:

FIG. 17 is a flow chart depicting example sequences of operations and procedures executed in accordance with certain methods and techniques of the present disclosure.

FIG. 18 is an example filtering rule evaluation table generated in accordance with certain techniques of the present disclosure.

FIG. 19 is a chart describing example combinations of operations and procedures executed in accordance with certain methods and techniques of the present disclosure.

Figure 1:
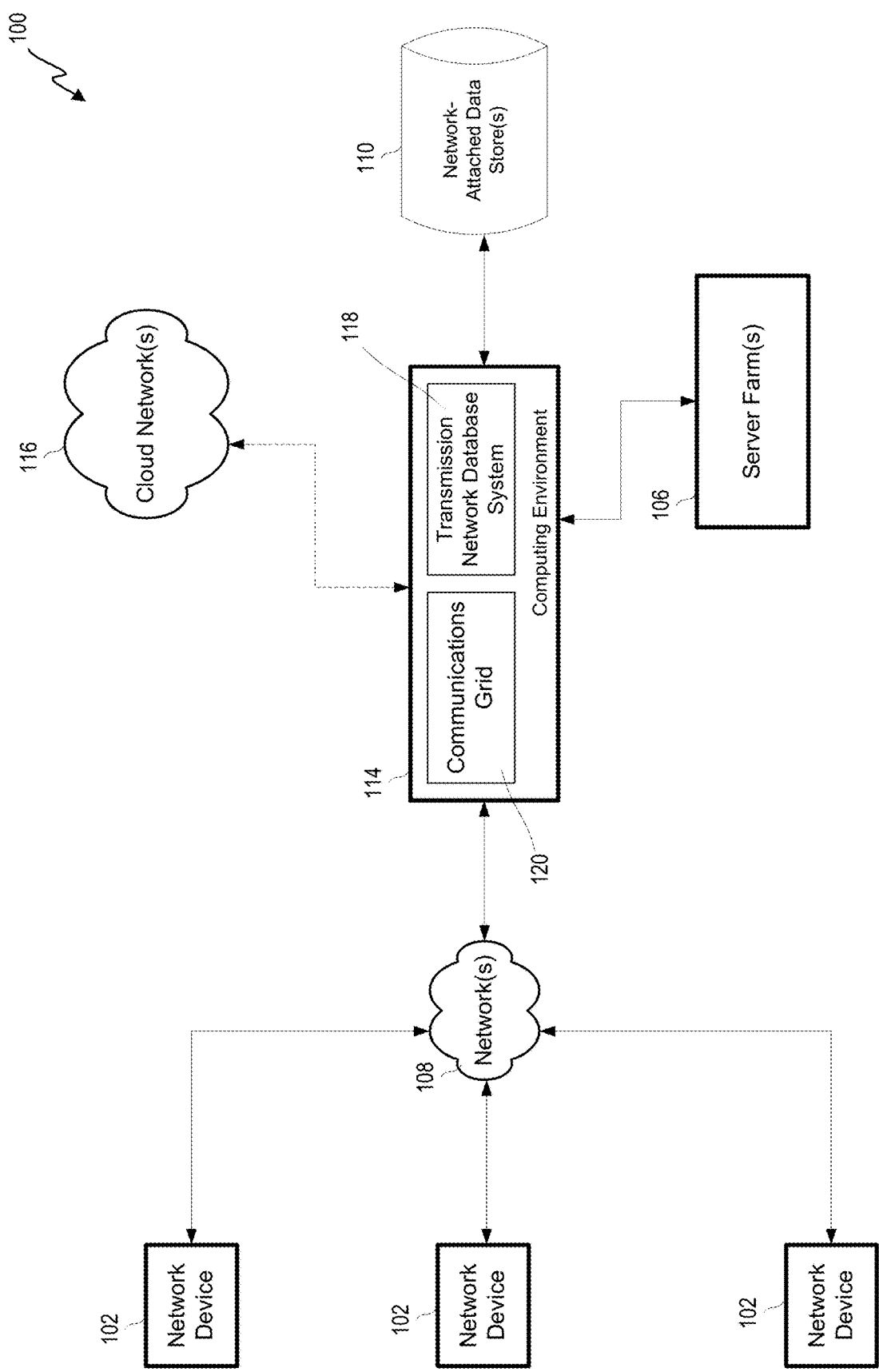
FIG. 1 illustrates a block diagram that provides an illustration of the hardware components of a computing system, according to some embodiments of the present technology.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, for the purposes of explanation, specific details are set forth in order to provide a thorough understanding of embodiments of the technology. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the technology as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional operations not included in a figure. A process may correspond to a method, a function, a procedure, a subroutine, a subprogram, etc. When a process corresponds to a function, its termination can correspond to a return of the function to the calling function or the main function.

Systems depicted in some of the figures may be provided in various configurations. In some embodiments, the systems may be configured as a distributed system where one or more components of the system are distributed across one or more networks in a cloud computing system.

FIG. 1 is a block diagram that provides an illustration of the hardware components of a data transmission network 100, according to embodiments of the present technology. Data transmission network 100 is a specialized system that may be used for processing large amounts of data where a large number of processing cycles are required.

Data transmission network 100 may also include computing environment 114. Computing environment 114 may be a specialized or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
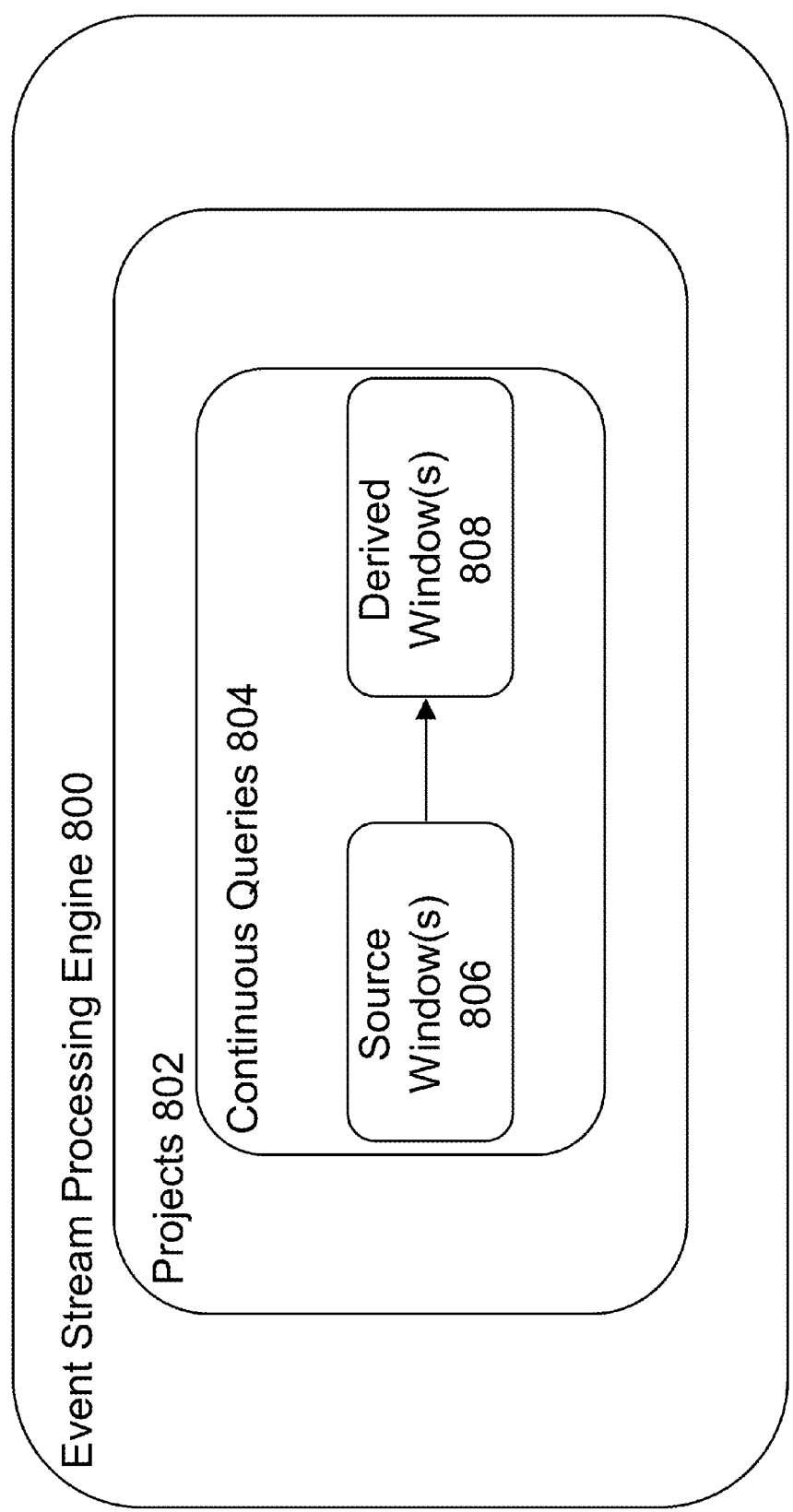
FIG. 8 illustrates a block diagram including components of an Event Stream Processing Engine (ESPE), according to embodiments of the present technology.
Figure 9:
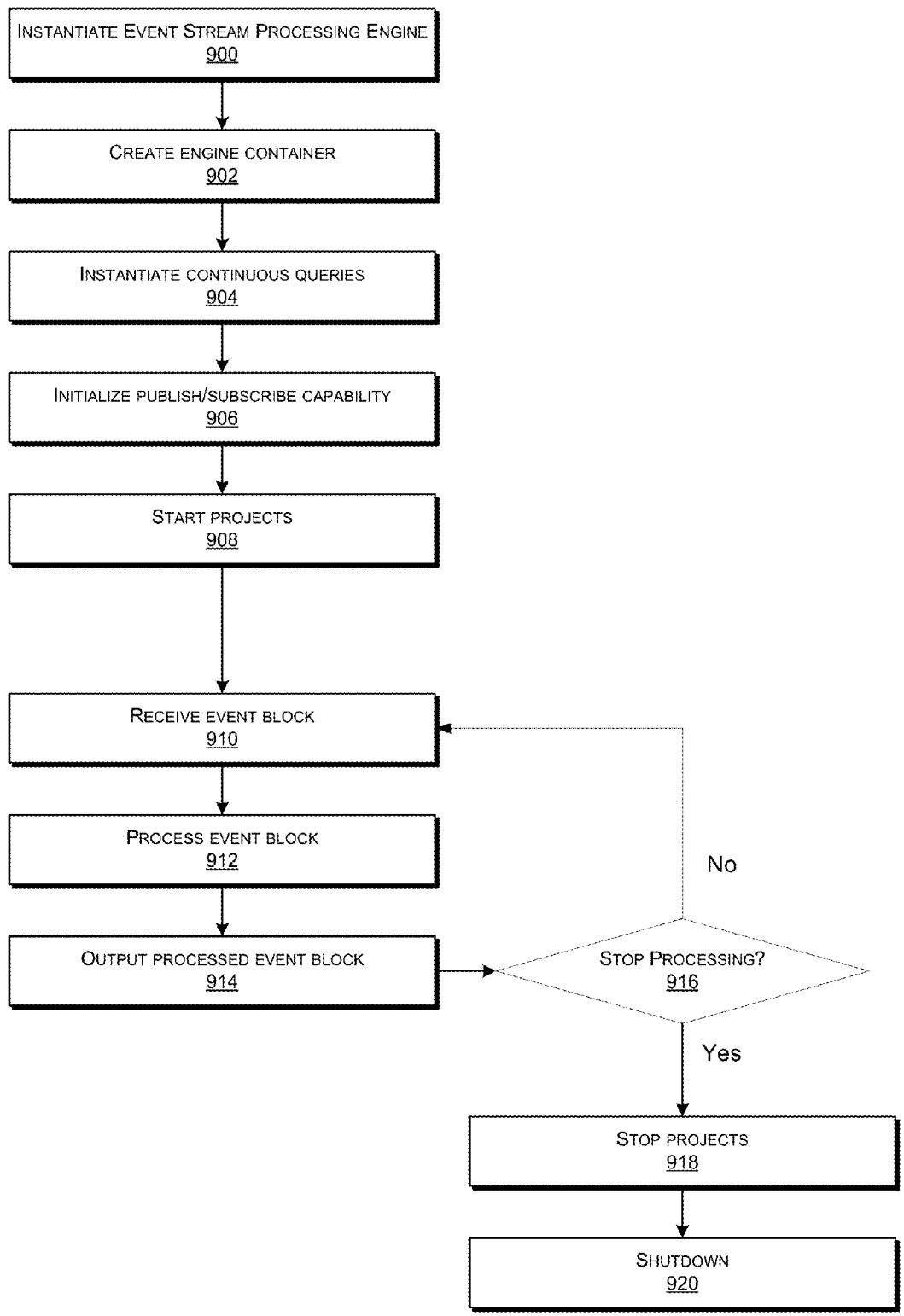
FIG. 9 illustrates a flow chart showing an example process performed by an event stream processing engine, according to some embodiments of the present technology.
Figure 10:
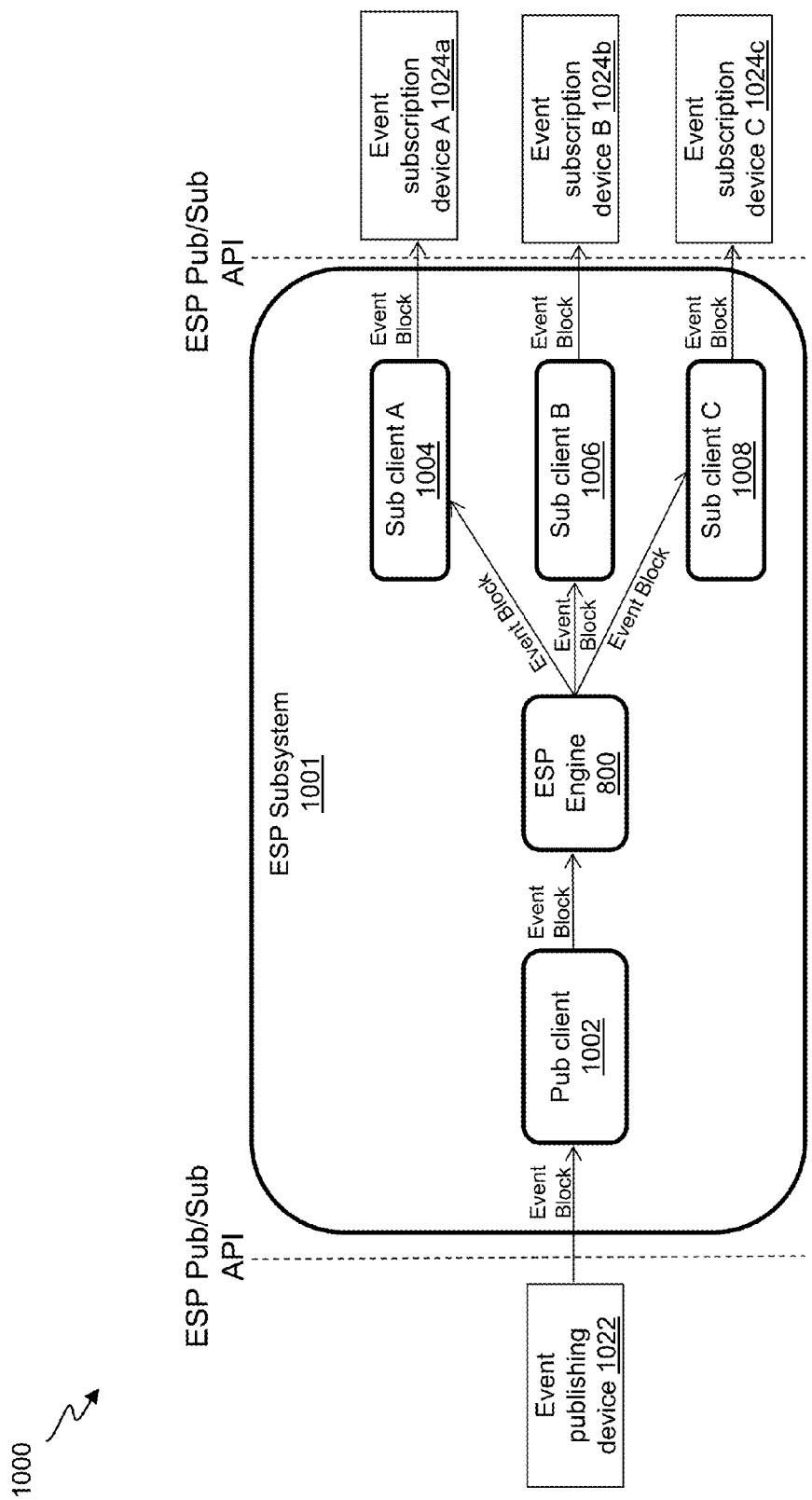
FIG. 10 illustrates an ESP system interfacing between a publishing device and multiple event subscribing devices, according to embodiments of the present technology.

In other embodiments, network devices may provide a large amount of data, either all at once or streaming over an interval of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices, and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying objects being manufactured with parameter data for each object, such as colors and models) or object output databases (e.g., a database containing individual data records identifying details of individual object outputs/sales).

The unstructured data may be presented to the computing environment 114 in different forms such as a flat file or a conglomerate of data records, and may have data points and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time interval units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system as needed. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may comprise one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, as needed, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between a device and connection system 150, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a Bluetooth or a Bluetooth Low Energy channel. A wired network may include a wired interface. The wired and/or wireless networks may be implemented using routers, access points, bridges, gateways, or the like, to connect devices in the network 114, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or event details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and relational analytics can be applied to identify hidden relationships and drive increased effectiveness. This can apply to both big data analytics and real-time (e.g., ESP) analytics. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
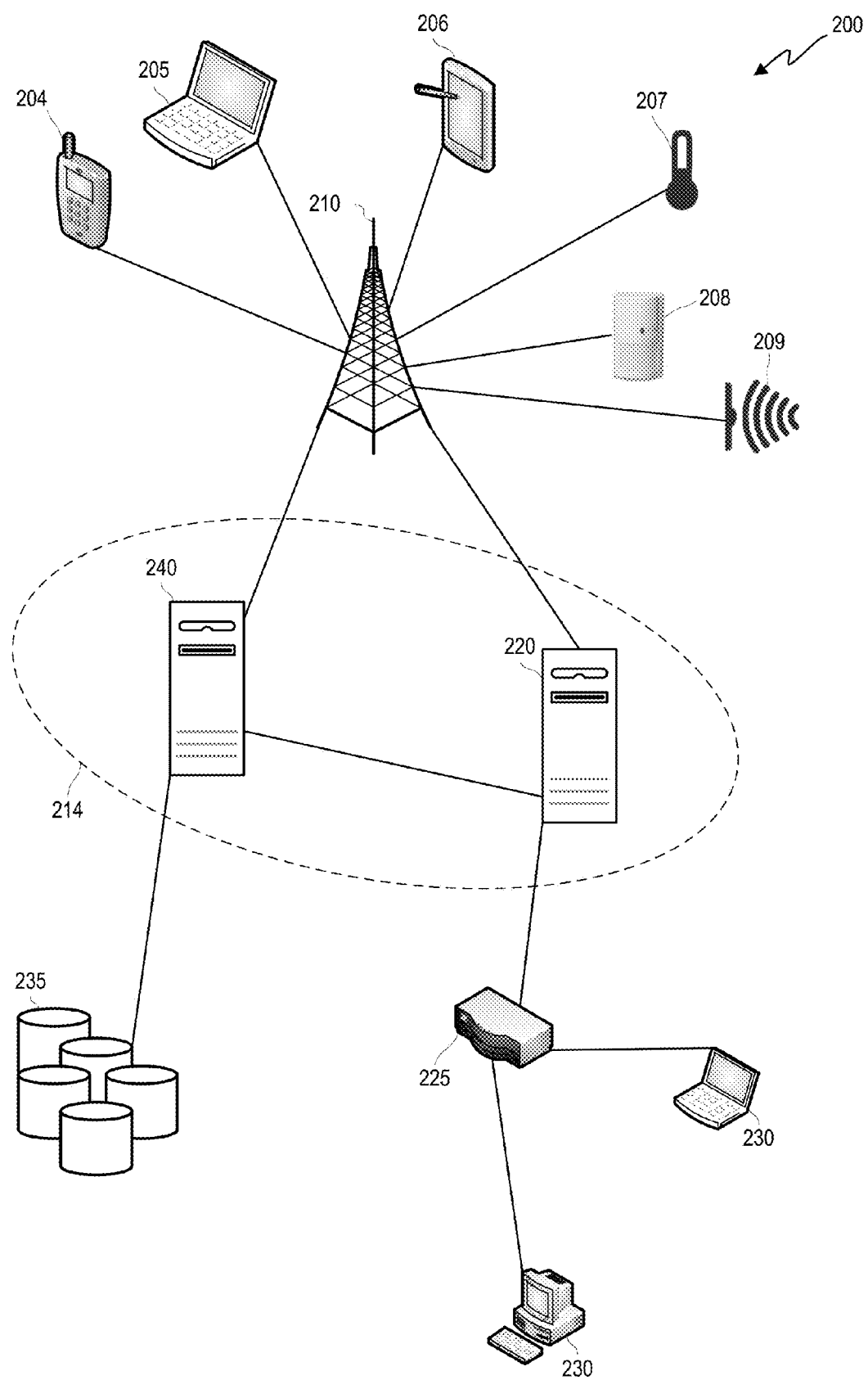
FIG. 2 illustrates an example network including an example set of devices communicating with each other over an exchange system and via a network, according to some embodiments of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, and homes, among others. One or more of such devices may include one or more sensors that detect energy gain or loss, electrical input or output or loss, and a variety of other benefits. These sensors may collect data to inform users of how the energy grid, and individual devices within the grid, may be functioning and how they may be better utilized.

Network device sensors may also process data collected before transmitting the data to the computing environment 114, or before deciding whether to transmit data to the computing environment 114. For example, network devices may determine whether data collected meets certain rules, for example by comparing data or points calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with devices 230 via one or more routers 225. Computing environment 214 may collect, analyze and/or store data from or pertaining to communications, client device operation, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server 240. Thus, computing environment 214 can retrieve data of interest, such as client information (e.g., object information, client rules, etc.), technical object details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over an interval of time for a client to determine results data based on the client's needs and rules.

Figure 3:
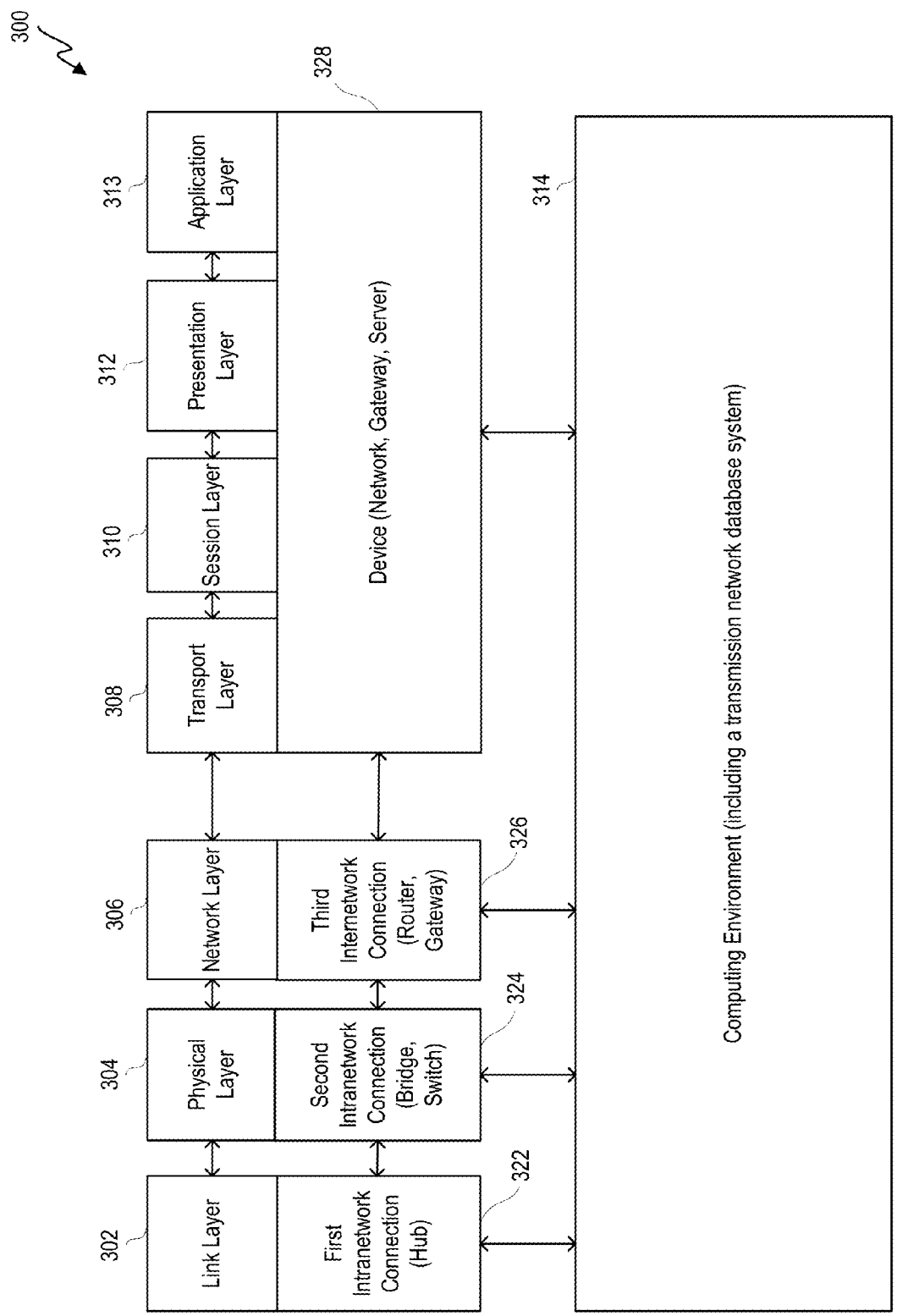
FIG. 3 illustrates a representation of a conceptual model of a communications protocol system, according to some embodiments of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 302-313. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data, and is the farthest layer from the user in a communications system. On the other hand, the application layer is the highest layer because it interacts directly with an application.

As noted, the model includes a physical layer 302. Physical layer 302 represents physical communication, and can define parameters of that physical communication. For example, such physical communication may come in the form of electrical, optical, or electromagnetic signals. Physical layer 302 also defines protocols that may control communications within a data transmission network.

Link layer 304 defines links and mechanisms used to transmit (i.e., move) data across a network. The link layer handles node-to-node communications, such as within a grid computing environment. Link layer 304 can detect and correct errors (e.g., transmission errors in the physical layer 302). Link layer 304 can also include a media access control (MAC) layer and logical link control (LLC) layer.

Network layer 306 defines the protocol for routing within a network. In other words, the network layer coordinates transferring data across nodes in a same network (e.g., such as a grid computing environment). Network layer 306 can also define the processes used to structure local addressing within the network.

Transport layer 308 can handle the transmission of data and the quality of the transmission and/or receipt of that data. Transport layer 308 can provide a protocol for transferring data, such as, for example, a Transmission Control Protocol (TCP). Transport layer 308 can assemble and disassemble data frames for transmission. The transport layer can also detect transmission errors occurring in the layers below it.

Session layer 310 can establish, maintain, and handle communication connections between devices on a network. In other words, the session layer controls the dialogues or nature of communications between network devices on the network. The session layer may also establish checkpointing, adjournment, termination, and restart procedures.

Presentation layer 312 can provide translation for communications between the application and network layers. In other words, this layer may encrypt, decrypt and/or format data based on data types known to be accepted by an application or network layer.

Application layer 313 interacts directly with applications and end users, and handles communications between them. Application layer 313 can identify destinations, local resource states or availability and/or communication content or formatting using the applications.

Intra-network connection components 322 and 324 are shown to operate in lower levels, such as physical layer 302 and link layer 304, respectively. For example, a hub can operate in the physical layer, a switch can operate in the physical layer, and a router can operate in the network layer. Inter-network connection components 326 and 328 are shown to operate on higher levels, such as layers 306-313. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system (DBMS), controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
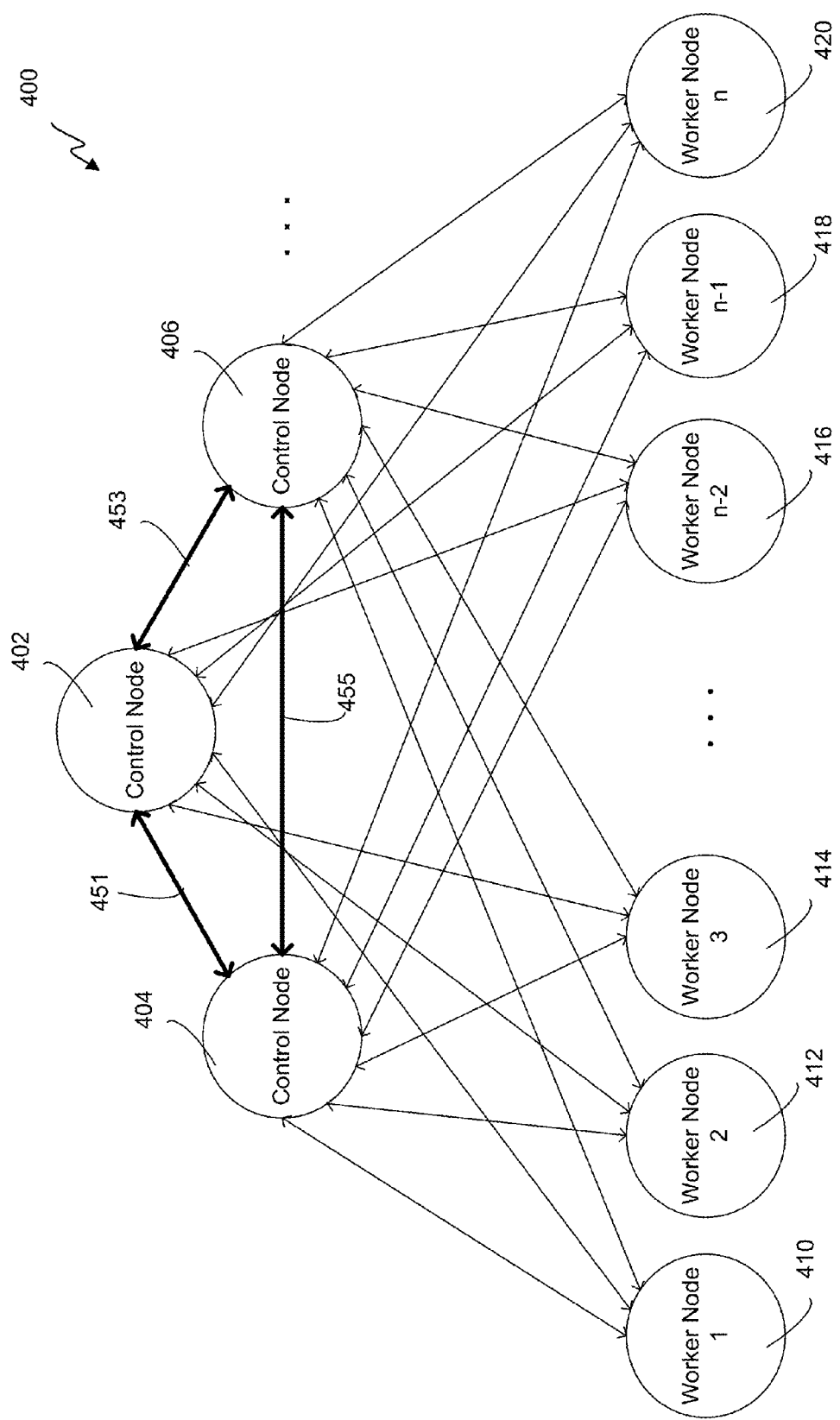
FIG. 4 illustrates a communications grid computing system including a variety of control and worker nodes, according to some embodiments of the present technology.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be receive or stored by a machine other than a control node (e.g., a Hadoop data node).

Control nodes may maintain knowledge of the status of the nodes in the grid (i.e., grid status information), accept work requests from clients, subdivide the work across worker nodes, coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A control node, such as control node 402, may be designated as the primary control node. A server or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most effectively and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes). The primary control node may be provided with a list of other nodes (e.g., other machines, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined interval of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

Figure 5:
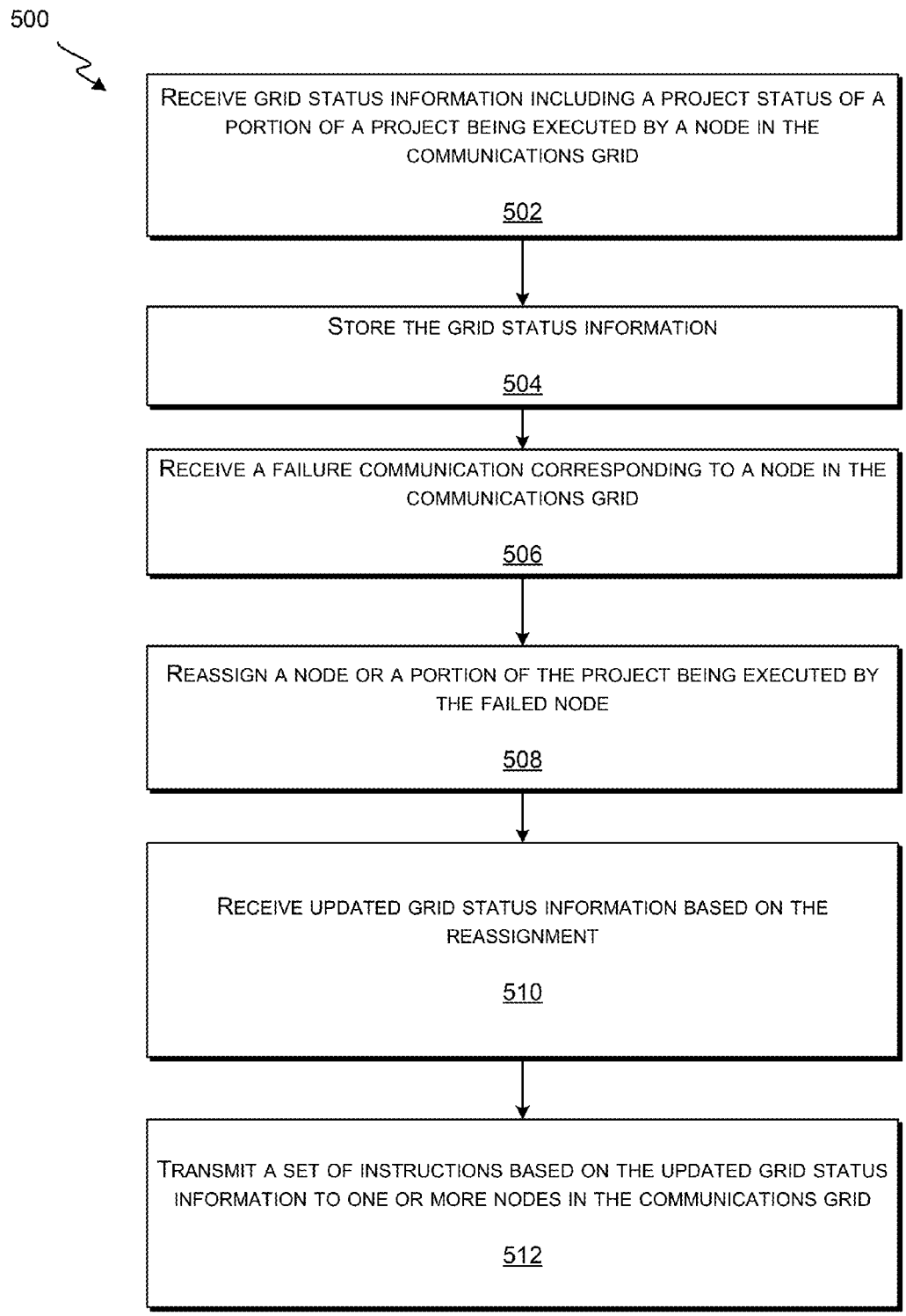
FIG. 5 illustrates a flow chart showing an example process for adjusting a communications grid or a work project in a communications grid after a failure of a node, according to some embodiments of the present technology.

FIG. 5 illustrates a flow chart showing an example process for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
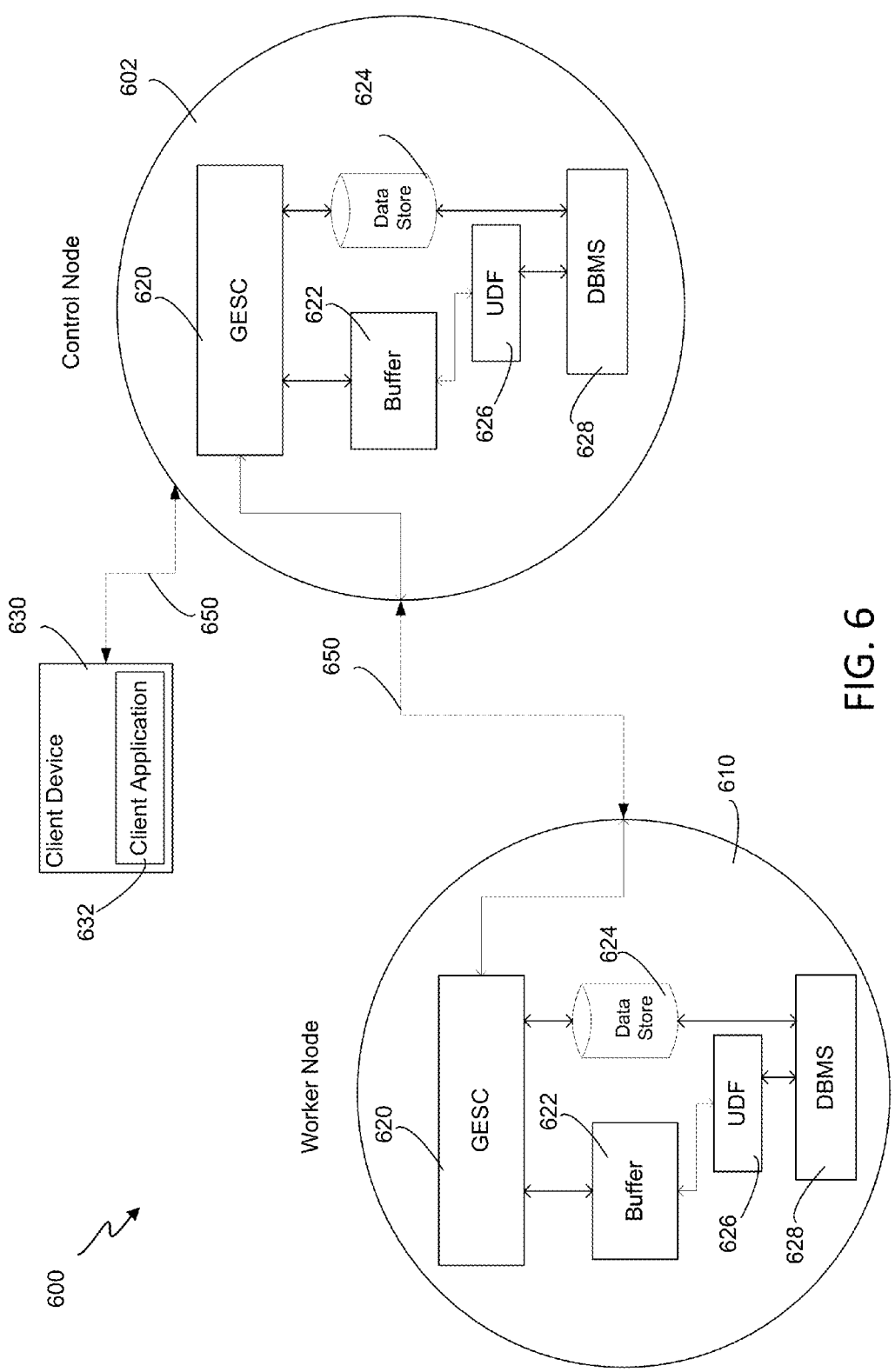
FIG. 6 illustrates a portion of a communications grid computing system including a control node and a worker node, according to some embodiments of the present technology.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 comprise multi-core data processors. Each node 602 and 610 includes a grid-enabled software component (GESC) 620 that executes on the data processor associated with that node and interfaces with buffer memory 622 also associated with that node. Each node 602 and 610 includes a DBMS 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DMBS 628 to transfer data to or receive data from the database stored in the data stores 624 that are handled by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 620 may be connected via a network, such as network 108 shown in FIG. 1. Therefore, nodes 602 and 620 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DMBS 628 may control the creation, maintenance, and use of database or data structure (not shown) within a nodes 602 or 610. The database may organize data stored in data stores 624. The DMBS 628 at control node 602 may accept requests for data and transfer the appropriate data for the request. With such a process, collections of data may be distributed across multiple physical locations. In this example, each node 602 and 610 stores a portion of the total data handled in the associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
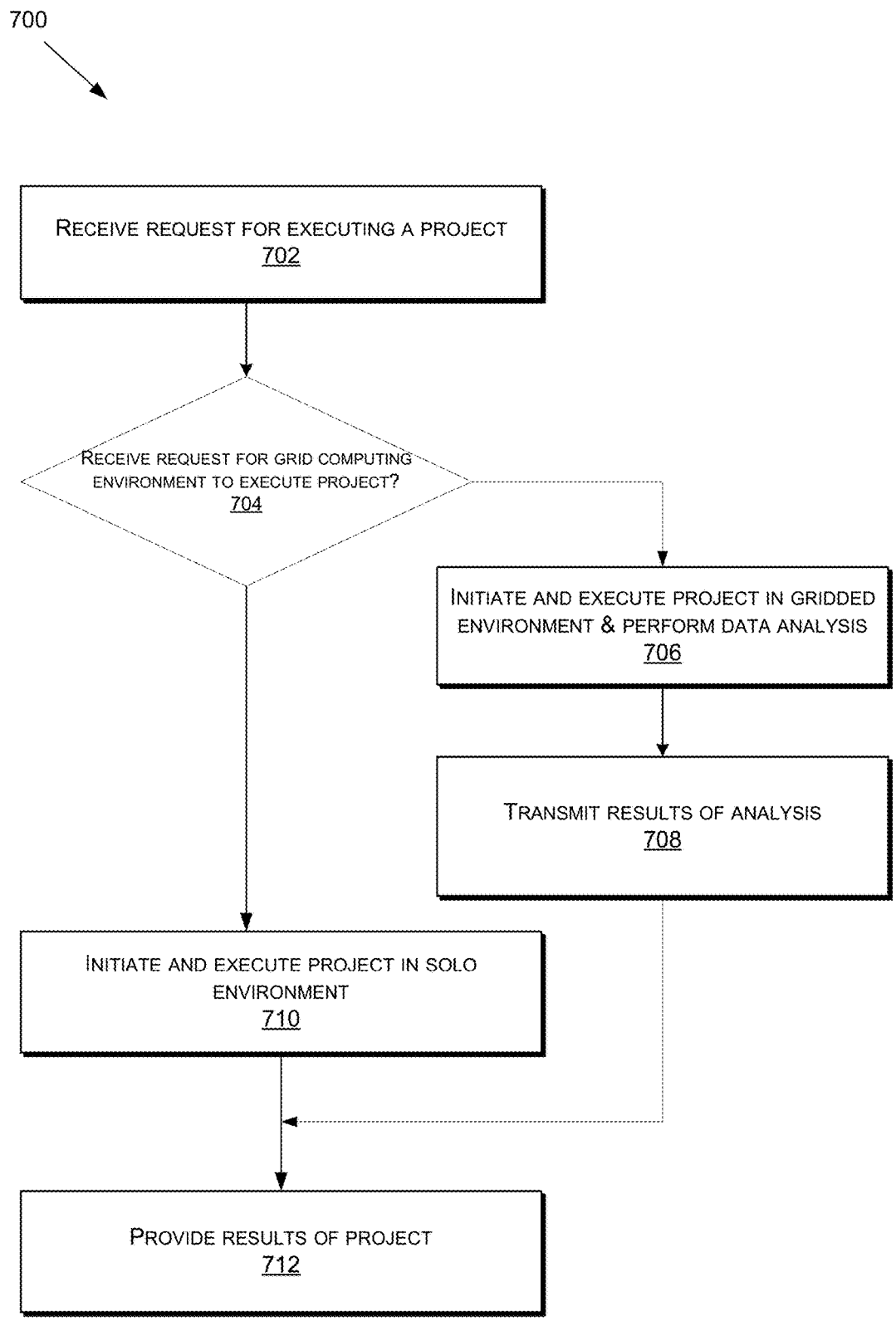
FIG. 7 illustrates a flow chart showing an example process for executing a data analysis or processing project, according to some embodiments of the present technology.

FIG. 7 illustrates a flow chart showing an example method for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024a-c, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model handled by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over an interval of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that handles the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other techniques on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, WL, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field data points and include both metadata and field data associated with an event. The metadata may include an opcode indicating if the event represents an insert, update, delete, or upsert, a set of flags indicating if the event is a normal, partial-update, or a retention generated event from retention policy handling, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process of an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a handler for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and handling (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 1000 interfacing between publishing device 1022 and event subscribing devices 1024*a-c*, according to embodiments of the present technology. ESP system 1000 may include ESP device or subsystem 1001, event publishing device 1022, an event subscribing device A 1024*a*, an event subscribing device B 1024*b*, and an event subscribing device C 1024*c*. Input event streams are output to ESP device 1001 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024*a*, event subscribing device B 1024*b*, and event subscribing device C 1024*c*. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024a, event subscribing device B 1024b, and event subscribing device C 1024c, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024a, event subscribing device B 1024b, and event subscribing device C 1024c.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 1022.

ESP subsystem 800 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024a using the publish/subscribe API. Subscribing client B 1006 may be started by an event subscription application B executing at event subscribing device B 1024b using the publish/subscribe API. Subscribing client C 1008 may be started by an event subscription application C executing at event subscribing device C 1024c using the publish/subscribe API.

An event block object containing one or more event objects is injected into a source window of the one or more source windows 806 from an instance of an event publishing application on event publishing device 1022. The event block object may generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 806, and subscribing client C 808 and to event subscription device A 1024a, event subscription device B 1024b, and event subscription device C 1024c. Publishing client 1002 may further generate and include a unique embedded event ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024a-c. For example, subscribing client A 804, subscribing client B 806, and subscribing client C 808 may send the received event block object to event subscription device A 1024a, event subscription device B 1024b, and event subscription device C 1024c, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a machine-readable medium operably coupled to the processor. The processor is configured to execute an ESP engine (ESPE). The machine-readable medium has instructions stored thereon that, when executed by the processor, cause the computing device to support the failover. An event block object is received from the ESPE that includes a unique identifier. A first status of the device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory machine-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory machine-readable medium.

In various embodiments, systems, methods, and products of the invention are used to classify activity through the analysis of data. U.S. patent application Ser. No. 14/062,062, filed on Oct. 24, 2013, and U.S. Provisional Application 61/782,537, filed on Mar. 14, 2013, which are hereby incorporated by reference in their entireties for all purposes, disclose useful systems, methods, and products for activity classification.

Organizations can use analytical algorithms to monitor data generated by user database activity. As used herein, the terms account and database may be used interchangeably, and may refer to a financial account and records associated therewith. The data details activity involving the user database, and tends to be analyzed promptly after being registered. For example, when a charge-control device user registers a charge-control device to initiate an event, such as to make a transaction, data observations are recorded. These observations often include an identification of the charge-control device being used, the amount of value involved in the requested operation, a location or identification of the organization accepting the charge-control device, and a timestamp, among other things.

Processing the requested control device event may involve transmission of the data to a remote server, via a secure network connection. At the remote server, the data is analyzed by a classification and scoring algorithm for detecting unauthorized control device activity. Typically, the algorithm can use stored data resulting from the user's previous database activity or interpretive parameters, guidelines, or formulas previously calculated in response to information learned about the user through past database activity If the algorithm determines that the requested event is likely to have been legitimately requested by the user, the requested event is classified as authorized and further processed to completion. Otherwise, the event may be classified as unauthorized and denied. In both cases, the data observations recorded in response to the requested event are stored, and may also be used to update any interpretive parameters, guidelines, or formulas used by the detection algorithm to analyze the user's database activity.

By detecting unauthorized database activity, an organization may be able to avoid or reduce unauthorized activity. However, unauthorized events tend to be far less frequent than legitimate events and can be very hard to detect. Sophisticated attackers frequently moderate and alter their activity to avoid generating abnormal or outlying event data and hinder detection mechanisms. Moreover, when unauthorized activity is not detected by a detection algorithm and results in a permitted event, the permitted event may eventually improperly affect the collection of data that the algorithm uses to interpret the user's normal behavior (e.g., eventually, the unauthorized/abnormal behavior will come to look normal after some time has passed).

Also, there can be issues associated with incorrectly classifying legitimate database activity as being unauthorized. For example, by rejecting a legitimately requested event or blocking a control device in response to an erroneous event classification, an organization may cause user dissatisfaction, suffer administrative concerns, as well as opportunity costs. In fact, over a sample of numerous permitted control device events, the issues associated with such erroneous responses to legitimate activity (i.e., "false-positive" detections) may be substantial in comparison with those resulting from failures to detect unauthorized events.

Within the arenas encompassed by the scope of this disclosure, algorithmic detection and classification of unauthorized activity is characterized by a frequently encountered theme. In many classification environments, a majority (and very high volume) of activity can be very accurately classified with relative ease. For most events in this group, these accurate results can be obtained by analyzing only a relatively small amount of data, and subjecting that limited data to a small number of analytical processes (i.e., performing few computations). Additionally, most of this activity may entail relatively minimal risk for the hosting entity with which the activity is conducted.

However, much of the remaining small percentage of activity may be exceedingly difficult to analyze, while at the same time entailing large risks (false-positive or false-negative risks) or rewards (the value of a true-negative or true-positive classification) for the classifying entity. In classifying this portion of activity, very complex algorithms capable of analyzing vast amounts of data in many different ways may be necessary to obtain reliable classification results. Moreover, although there is room for substantial improvement in classifying this portion of activity, achieving meaningful improvements in classification performance may often necessitate increases in data-analysis capacity and algorithmic complexity. Nonetheless, in light of the fact that most activity can be accurately detected with simple algorithms, there is a risk of deleteriously wasting processing resources and thereby diminishing classification capabilities by misapplying a high-order detection algorithm to classify activity which does not necessitate higher-order analysis to be accurately classified.

The present disclosure presents techniques which may be used both to increase the rate at which unauthorized database activity is detected and decrease the rate at which a detection algorithm makes false-positive detections. Moreover, the techniques may be implemented in an efficient manner, such that only moderate increases in data storage and data processing are required, as compared to the techniques for detecting unauthorized database activity which are in current use.

As previously mentioned, unauthorized database activity is currently detected by analyzing events in light of past data associated with a user's database activity and background user information obtained during creation or maintenance of the database. However, entities that provide a particular type of service to users also provide many of those same users with separate services. In such cases, the entity separately obtains activity data related to the provided services.

For example, an organization may provide a control device service to an individual user. As a result of providing the control device service, the organization will ordinarily obtain personal data, past event data, duty information, data related to database maintenance, and other information depicting or related to the use of the user's control device and maintenance of the control device and database. In many cases, the same organization may also provide one or more additional services to the same user, or to a group with which the user is associated.

Thus, the user may have a database which may be associated with one or more databases held at the same organization that provides the control device service. The organization could also have a relationship with the user involving any other type of service. In any of these example organization-user relationships, the organization may separately accumulate activity data involving any of the additional provided services, in addition to the information associated with the user's control device and database. The activity data involving the additional provided services may provide valuable information relevant to the analysis and classification of control device activity.

However, current unauthorized activity detection mechanisms perform only isolated analysis of data associated with a provided service, even when the service is used by a user who also uses an additional service provided by the same organization. Thus, in the case of a user who is both a charge-control device and database user of an organization, charge-control device activity data is not taken into account when access-control device activity data is analyzed to detect unauthorized activity involving only the user's access-control device. Similarly, charge-control device activity data is separately analyzed in isolation, and only for the purpose of detecting unauthorized activity involving the charge-control device.

Figure 11A:
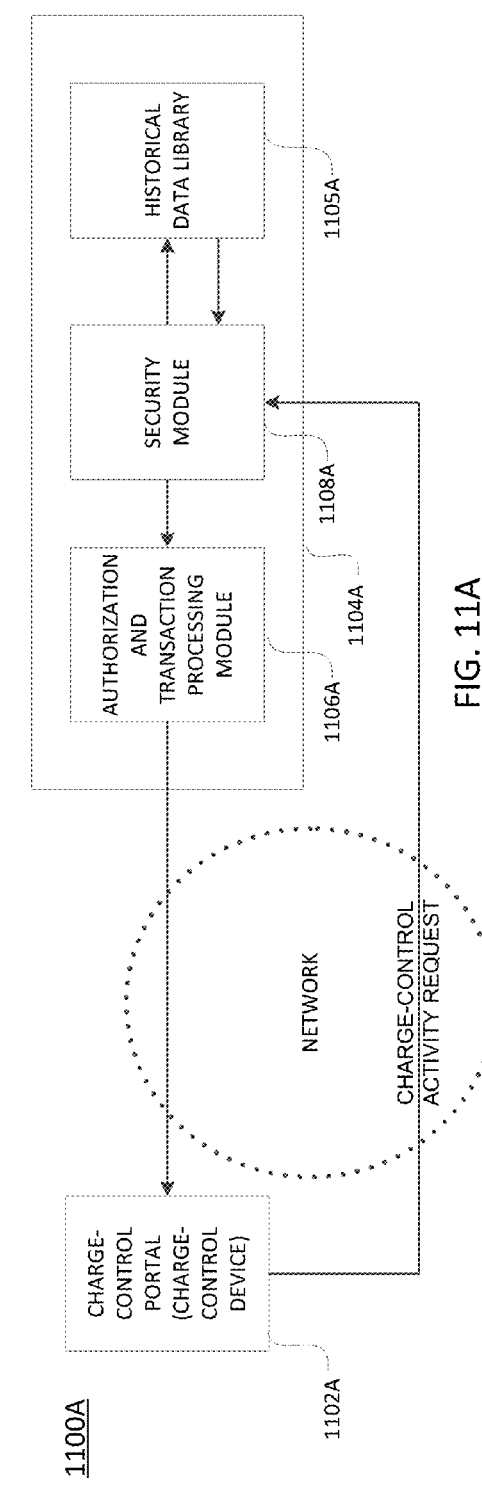
FIG. 11A and FIG. 11B are simplified diagrams of example systems used to detect unauthorized activity.

FIG. 11A illustrates a simplified diagram of a widely-used system 1100A for processing charge-control device events and detecting unauthorized activity involving a user's charge-control device and an associated database. As depicted in FIG. 11A, system 1100A includes a remote server 1104A which includes a past data library 1105A, a charge-control device authorization and event processing module 1106A and a user database security module 1108A. System 1100A also includes various entity-user event interfaces 1102A. Entity-user event interfaces enable user charge-control device information to be inputted when the entity wishes to complete an event. Common web-based cart portals and charge-control device terminals are two examples of an entity-user event interface 1102A.

As depicted in FIG. 11A, a user (the user, in the case of an authorized event, or an unauthorized or other user, in the case of an unauthorized event) inputs charge-control device data through an entity-user event interface 1102A in order to complete an event. Event interface 1102A transmits the inputted data, as well as other data depicting the requested event, as part of an authorization request. The authorization request is transmitted to the remote server 1104A. Commonly, the authorization request will include data components which describe the value proposed for the event, an authorization request time stamp, and an identification and location of the entity involved in the requested event.

The data is processed at the remote server 1104A, which uses the authorization module 1106A to determine whether the event should be authorized. Authorization module 1106A accesses the charge-control device past data library 1105A to obtain stored charge-control device activity data, parameters, or interpretive guidelines related to the user's charge-control device and database. The activity data, parameters, or interpretive guidelines are routinely updated based on the user's use and maintenance of the charge-control device and database. For example, updates may be performed whenever the user makes a purchase using the charge-control device, changes an address associated with the database, or makes an online login.

Authorization module 1106 analyzes and classifies the proposed event using the obtained data, parameters, or interpretive guidelines. Classification of the proposed event includes classifying the event as an authorized event or unauthorized event, and is done based on an estimation of the likelihood that the event is unauthorized. Classification may also include assigning a score to the event based on the estimated likelihood.

If the proposed event is classified as an authorized event, the event is permitted and an indication of permission is transmitted to the entity-user event interface. Following permission, the authorization module uses the activity data depicting the proposed event to update the charge-control device authorization and event processing module 1106A so that the user's record of charge-control device activity reflects the newly obtained information about the user's activity.

If the proposed event is characterized as an unauthorized event, a rejection message is transmitted to the entity-user event interface. Also, the score assigned to the event is reviewed by the user database security module 1108A. Based on the score, the user database activity security module 1108A activates additional security measures. For example, in response to a very high score (e.g., highly suspicious charge-control device activity), the user activity module 1108A may completely deactivate the user's charge-control device, send a phone or text message warning to the user, and/or deactivate the user's online password. Alternatively, when a proposed event is classified as unauthorized but the score is much lower, the user activity module 108 may impose less stringent security measures. For example, the user activity module 108 may command a phone call or text message be sent to the user to determine if the event was actually legitimate. In certain cases, the user activity module may impose these measures for certain events which result in both an authorized classification and a score which is higher than average for permitted events.

Figure 11B:
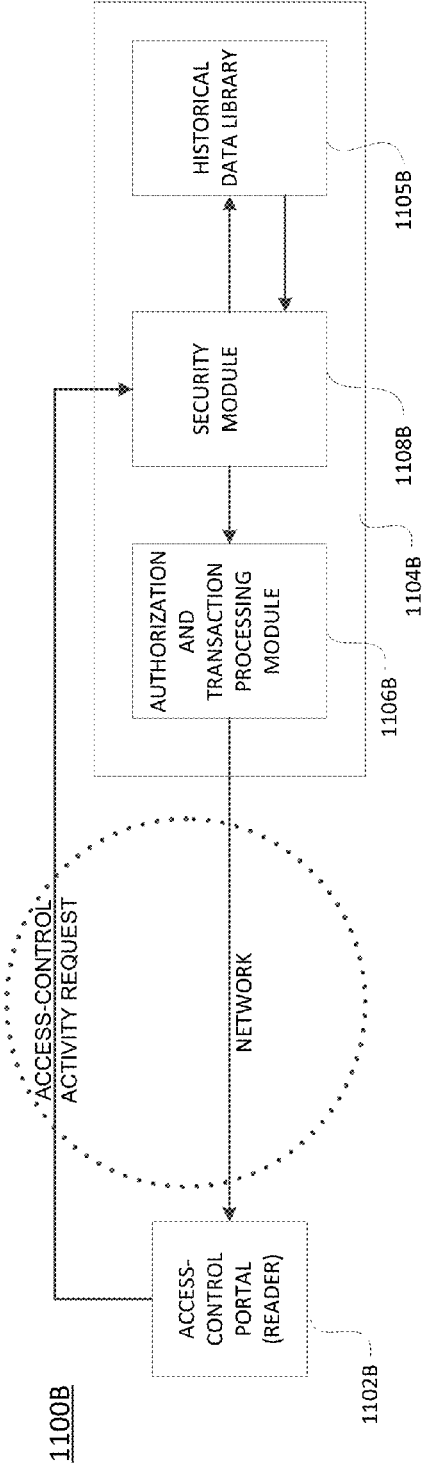

FIG. 11B also shows a commonly-used system 1100B which enables the same user to also obtain access-control device services. The access-control device services may be provided to the user by the same organization or organization which provides the charge-control device services described with reference to system 1100A. Alternatively, the access-control device services may be provided by an organization or organization that operates in association with the organization that provides the user with charge-control device services through system 1100A. Components of this system include entity-user event interface 1102B, remote server 1104B, past data library 1105B, authorization module 1106B, and user database security module 1108B. Moreover, each component of system 1100B performs a function similar to the commonly-numbered component of system 1100A. However, each component of system 1100B handles data and processing of access-control device events only.

As illustrated by charge-control device system 1100A, access-control device system 1100B, and the depicted independence of these systems, access-control device events involving a user database are processed and permitted or rejected without regard to data or activity involving the user's charge-control device and database. Similarly, charge-control device events involving the user's charge-control device and database are processed and permitted or rejected without regard to data or activity involving the user's access-control device.

Similar combinations of systems for performing isolated, parallelized processing, event scoring and classification are encountered when other combinations of services are provided to users by a single entity. For example, database access machine unauthorized activity detection mechanisms are currently used by many organizations to evaluate users' past activity so as to be able to classify and make authorization decisions regarding requested database access machine events. As used herein the phrase "database access machine" may be used interchangeably with "automated teller machine." Within any one of these organizations, several of the users may also control other objects. In this case, proposed events generate activity data which is analyzed and evaluated by an object unauthorized activity detection mechanism in light of stored past data, parameters or interpretive guidelines derived from past use and management of the object by the user.

The present application provides techniques for improving a detection mechanism's performance characteristics in monitoring the databases of users that obtain multiple services from a related entity, or for which past activity involving multiple services is otherwise available. The techniques involve selectively broadening the analysis of users' past activity data so that, in certain circumstances, individual classifications and authorization decisions with respect to requested user activity are based on activity data associated with a user's use of multiple (two or more) services.

This application provides example techniques for performing such analysis when multiple sources of data are used in combination to inform individual unauthorized activity detection decisions and security responses. Also, in order to prevent the broadening of data sources from requiring an excessive amount of processing or data storage resources, techniques are provided for filtering the data in a cost-effective way, so as to obtain significant improvements in classification performance in a manner which is efficient and practical in light of the processing resources available.

The techniques of the present disclosure shall be understood as applicable within any context involving an attempt to detect activity that may be unauthorized or illegal (hereinafter, activity that is unauthorized or illegal will be referred to simply as "unauthorized," even though such activity need not involve deception) involving any type of service ("first service" for ease of reference) provided to a user by an entity, provided that the entity also has access to data related to an additional service ("second service," and possibly, but not necessarily, a "third service," "fourth service," etc.), and that this additional data depicts some user activities separate from the user's use of the first service. Moreover, the term "user" shall be understood herein to refer to any person, group, organization, or association that acts as a. The term user may also refer simultaneously to an individual or group which has access to a first service, and a broader or different group which has access to a second service and is in some way associated with the individual or group connected with the first service. Thus, for example, this disclosure shall be understood as being applicable in the case of an organization which provides a database service to an individual, and which also provides, through a separate database, a same or different service to an organization controlled or influenced in some way by the individual.

Figure 12:
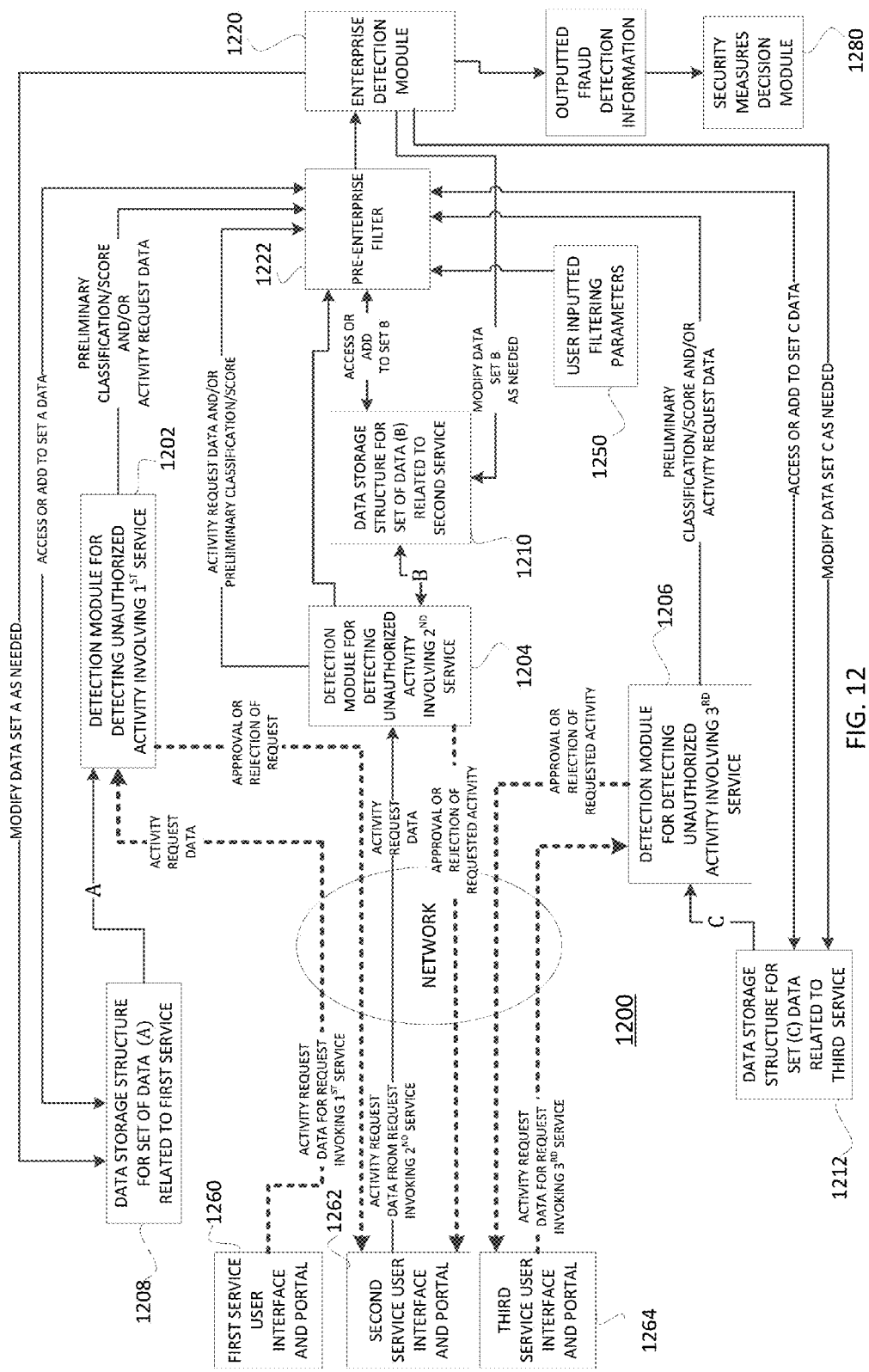
FIG. 12 depicts a block diagram of an example of a system embodying certain aspects of the present disclosure.

FIG. 12 illustrates a generalized system for detecting unauthorized activity involving any one of three services provided to a single user. The system of FIG. 12 may additionally be used to detect unauthorized activity involving a service provided to one or more other users who obtain only one service from the entity. However, when this additional type of detection is performed, certain components of FIG. 12 may be excluded from the detection process. The entity providing the service or services to the users may be any type of entity capable of providing multiple types of user service which could be used in an unauthorized or illegal manner.

FIG. 12 shall be understood to illustrate one example implementation of the techniques disclosed herein. Several other alternative implementations of the techniques will be recognizable to a person of ordinary skill in the art having reference to the present disclosure. Moreover, the following discussion of the implementation depicted in FIG. 12 is provided only for exemplary purposes, and shall not be understood to limit the scope of this disclosure in any way.

The detection system 1200 may be used to detect unauthorized activity related to usage of a first, second or third service or database provided to any number of users. However, as will be explained in greater detail later on, when system 1200 is used to analyze and classify requested activity, certain components of the system may perform analysis using data which is unique to the user whose identifying information, credentials, or database information is invoked by the activity request. Thus, for explanatory reasons, and in the interest of simplicity, the operations of system 1200 and its components will be described only with regards to requested activity which invokes the identifying information, credentials, or database information of a single example user (in the following discussion of FIG. 12, this user will be referred to as "the user") to which the first, second and third service is provided. This focus of the discussion shall in no way limit the scope of this disclosure from including detection systems which may be applied to more than one user database independently.

As depicted, system 1200 enables users to use both a first, second and third service. This combination of services may include any services which involve using a user identity, password, event control device, or other database or user information, and therefore may encounter unauthorized use. Alternatively, any one of the services could be a service that, for any reason, may require monitoring or control to prevent abuse of the service, illegal activity, or excessive unpermitted behavior.

When system 1200 is used by a user for requesting activity involving the first, second or third service, the user submits the request through either interface and portal 1260, 1262, or 1264, depending on which service is being requested. Portals 1260, 1262, and 1264 are configured to generate activity request data. Commonly activity request data will include an IP or network number to identify the portal at which the request is inputted. The interface and portals 1260, 1262, 1264 are also configured to generate additional activity request data which is appropriate for the respective services which they facilitate. As one example of an interface and portal which may be implemented within system 1200, if the first service is a control device database, interface and portal 1260 may be a conventional control device reader similar to those commonly used when processing purchases. If the first service is a database associated with a user's database, interface and portal 1260 may be a conventional database access machine or control device reader.

Hereinafter, both a request for activity and any data generated in response to the request may be referred to interchangeably as "activity request data," "activity data," "past activity data," "activity," an "activity request," "requested activity," or may be referred to using any other such similar term. Moreover, these interchangeable terms shall not imply any difference from one to the other. The term "activity request data" may be used at times for purposes of clarity or differentiation. For example, when multiple sources of data are discussed as being used for the purpose of classifying an instance of requested activity, use of the term "activity request data" may provide a means of differentiating the data generated in response to the request from other sources of data.

Within system 1200, three detection modules, 1202, 1204, 1206 are provided to process activity requests made at portals 1260, 1262, and 1264, respectively. The detection modules 1202, 1204, and 1206 may be located within a single server (not shown), or may reside at separate servers. Detection module 1202 is configured to detect unauthorized activity requests by preliminarily analyzing, scoring and classifying requests for activity which would involve the first service. Similarly, detection modules 1204 and 1206 are configured to detect unauthorized activity by preliminarily analyzing, scoring and classifying requests for activity which would involve the second and third service, respectively (hereinafter, the first, second and third service will be described as either the "service corresponding to" detection module 1202, 1204, and 1206, respectively, or as the "corresponding service" or "respective service" when reference is made to detection module 1202, 1204, or 1206, respectively). Hereinafter, when reference is made to any particular request for activity, the detection module 1202, 1204, or 1206 which performs the respective preliminary analysis, scoring and classification will be referred to as the "classifying detection module".

As will be explained in greater detail in subsequent paragraphs, in classifying and scoring requested activity involving their respective services, the detection modules 1202, 1204, and 1206 primarily evaluate user information and past data related to the user's use of the service being analyzed. Additional processing is also performed by other components of system 1200 whenever a request for activity involving the first, second, or third service is received. The outcome of this additional processing determines whether the initial detection module classification is maintained without further evaluation, or whether the activity request data is reevaluated in light of supplemental data—i.e., data depicting a user's past activity involving services not corresponding to the classifying detection module 1202, 1204 or 1206.

As one example of the combinations of services to which system 1200 may be applied, the first service may be an active control device database, the second service may be another database, and the third service may be an unrelated database. Classifying a request for activity may involve determining a likelihood that the requested activity is not authorized by the user, or is illegal (hereinafter the term "unauthorized" will refer to any activity or requested activity which is unauthorized, illegal, or otherwise not permitted) for the entity providing the first, second, and third services (hereinafter, this entity will be referred to simply as "the entity"). Classifying requested activity may involve classifying the activity as authorized activity or unauthorized activity. Scoring the requested activity may involve providing a score in addition to the classification. The score provides a detailed quantification of a calculated likelihood that the classified request proposes activity which is unauthorized.

Each score provided by a detection module 1202, 1204, or 1206 may be stored along with the activity request data for which the score was given. These scores may later be evaluated, in conjunction with human and expert data, so as to evaluate, understand, and refine or retrain the algorithms executed by the detection modules. For example, human experts may be used to investigate requested activity classified as unauthorized and, based on a thorough investigation, may generate highly-accurate conclusions in this regard. Additionally, when unauthorized activity is improperly classified as authorized, entities and users may provide inputs which can be used to generate highly-reliable unauthorized activity labels. By analyzing a past record of activity data, detection module classifications, scores, and accurate post-investigation labels, the performance characteristics (e.g., variability/consistency, overall accuracy, and strength/weakness characteristics) of the algorithms executed by a detection module may be understood.

When any one of the detection modules 1202, 1204, or 1206 analyzes a request for activity and classifies it as unauthorized, that detection module provides a communication that results in the request being rejected. Rejecting a request may involve cancelling a requested event, preventing access to a database, providing an error message, rejecting a database access machine request, or any other rejection action appropriate under the circumstances specific to the requested activity being rejected. System 1200 may also be configured to impose additional preliminary security measures in response to the unauthorized classification. The preliminary security measures may be one-time measures, temporary measures, or measures which remain in effect pending action by the user.

System 1200 may determine the additional preliminary security measures based on the score generated along with the "unauthorized" classification. An appropriate security measure may be determined based on the vulnerability or risk indicated by the score. The system may select one or more security measures from among multiple available security measures providing different levels of protection. Thus, if a detection module 1202, 1204, or 1206 detects a high degree of vulnerability and therefore assigns a high score to a rejected activity request, system 1200 may fully prevent the user from using the service invoked by the rejected request. If the score indicates a much lower degree of vulnerability, the system 1200 can impose a less secure security measure such as locking the user's database for a brief period of time or initiating a phone or text message warning or authorization inquiry directed to the user. In certain cases, system 1200 may determine not to impose any measure beyond a simple rejection of the requested activity.

With regards to detection modules 1202, 1204, and 1206, these modules may be configured to analyze, classify, and score a wide variety of requested activities. The requested activity may include any requested activity which is generally made available as part of the service corresponding to the particular detection module 1202, 1204, or 1206. For instance, in an exemplary case in which the first service is a control device database, detection module 1202 could be configured to individually classify and score requested events involving the user's control device database information, whether placed through an entity, website, database access machine, telephone, text, message-based service, or other event portal. Also, in this case, detection module 1202 could be configured to analyze, classify, and score online control device database logins, password changes, access attempts, database inquiries, changes of personal information, change of service requests, and any other type of database activity which could be unauthorized or used for illegal, deceptive, or harmful purposes.

The detection modules 1202, 1204, and 1206 classify requested activity based on past data describing past user use of their respective services. As part of this process, the detection modules 1202, 1204, and 1206 may perform analysis using interpretive guidelines, parameters, rules, procedures, or formulas based on the user's past activity involving their respective services. The detection modules 1202, 1204, and 1206 may update and augment this information to reflect most recent activity request data, analysis, and classifications. Any such past data or information which is generated, obtained, stored, or processed by a detection module 1202, 1204, or 1206 for the purpose of analyzing later requested activity will be referred to as user interpretive information.

Data storage structures 1208, 1210, and 1212 are used to store user information with regards to their respective services. Hereinafter, as indicated in FIG. 12 for ease of reference, this disclosure will refer to the sets of interpretive information stored in data storage structures 1208, 1210, and 1212 as set A, set B, and set C, respectively. As depicted, detection modules 1202, 1204, and 1206 have direct access to set A, set B, and set C, respectively.

Data storage structures 1208, 1210, and 1212 are used by, and correspond to, detection modules 1202, 1204, and 1206, respectively. As such, data storage structures 1208, 1210, and 1212 also correspond the first service, second service, and third service, respectively. Data storage structures 1208, 1210, and 1212 may be located within the same server as the detection module 202, 204, and 206 to which each structure corresponds, or may reside separately.

Any or all of the detection modules 1202, 1204, and 1206 may incorporate a neural network, machine-learning, or artificial intelligence algorithm trained with past data. Such an algorithm may be used to analyze user interpretive data and provide classification and scoring of requested activity. The training of such an algorithm for analyzing requested activity involving a particular user's database may involve using past training data depicting some of that user's previous database usage activity. Additionally or alternatively, the training data may include past activity data depicting the activity of other previous users who used the same service as the user, and had personal characteristics or tendencies similar to the user. The training data may include event information describing each of numerous past events or other user activities deemed to be legitimate. For purposes of this disclosure, an event or activity is legitimate when it is authorized by the user, does not violate a term or condition of service applicable to the user, and is neither deceptive nor illegal. The training data may also include event data connected with past events or other user database activities known to have been unauthorized.

Because the detection modules 1202, 1204, and 1206 only analyze user interpretive data related to their respective services, the observations, information, and data reviewed by a classifying detection module 1202, 1204, or 1206 is limited to a smaller subset of the total data and observations than are processed by system 1200 as a whole. This use of segmented analysis and processing enables the avoidance of unnecessary computational complexity within detection modules 1202, 1204, and 1206. By avoiding complexity, each detection module 1202, 1204, and 1206 is able to perform the processing needed to classify and score requested activity in a manner that is fast enough for users to obtain suitable service. Because the classification performed by detection modules 1202, 1204, and 1206 is segmented, may require relatively few resources, and can be performed in minimal time, classification by detection modules 1202, 1204, and 1206 will, at times, be referred to hereinafter as "simple-efficient classification."

However, although simple-efficient classification can be done in minimal time, exclusive reliance on simple-efficient classification may not be optimal in all cases. For example, in certain instances of requested activity related to use of a particular service, classification and scoring may be improved further by combined analysis of information related to the user's use of other services.

For example, this type of opportunity for improvement could occur in a situation in which a user obtains and uses control device, personal database services, and other services provided by a single organization. An activity request could invoke this user's control device database information as part of a requested event occurring at a location that is both far from the user's home and substantially removed from all other locations indicated by the user's past control device activity. However, in such a case, the requested event might occur near where the user made previous authorized checking database activity. The location might also be near where the user made legitimate branch visits to manage another database. In this hypothetical situation, if only the user's past control device activity is considered (e.g., as part of simple-efficient classification), the requested control device event could appear sufficiently abnormal to be rejected by a detection module such as detection module 1202, 1204, or 1206.

However, this user's checking database activity and past branch visit activity provide supplemental information that implies that the requested control device event is less likely to be unauthorized than simple-efficient classification alone would find. In other words, a more informed understanding of the requested control device event could be used to better classify it. In fact, a large amount of supplemental information, such as the information described in this example scenario, may be used to improve classification of a wide variety of requested activity, as compared to the performance of single-stage, simple-efficient detection module classification.

Nonetheless, although classification accuracy can generally be improved through the analysis of data related to multiple services, the evaluation of multiple sources of data as part of each requested activity classification may not always be efficient and practical. For many instances of requested activity, the simple-efficient analysis performed by detection modules 1202, 1204, or 1206 may provide highly reliable classification. For example, a majority of control device users make frequent, routine events near their workplace or residence in a very predictable manner. Moreover, in many of these cases, the event amount is small, meaning that the event carries little risk for the entity providing the requested control device service. A detection module such as detection module 1202 may be able to classify these events with a very high degree of accuracy, while using only simple-efficient classification techniques. Moreover, the fact that the event amounts are small means that the few errors made in classifying them with simple-efficient analysis may result in minimal harm to the operating entity.

In classifying these and other similar events, it may be inefficient or impractical to evaluate database or other service data related to the user. Moreover, in the case of these routine events, the consideration of such additional information may provide insignificant or no improvement in classification results, as simple-efficient classification by itself may suffice for extremely accurate classification with minimal room for improvement.

In accordance with the present disclosure, a cascaded enterprise classification/detection module 1220 may be efficiently used to review a portion of the simple-efficient classifications made by detection modules 1202, 1204, and/or 1206. When reviewing a classification of requested activity involving a service provided to the user, the cascaded classification module 1220 is provided with some supplemental user activity data so as to increase its evaluation accuracy. Supplemental user activity data may be understood as referring to data that depicts a user's past activity involving one or more additional services (databases) apart from the user's use of the database invoked by the reevaluated activity request. For example, when further evaluating any requested activity classification made by detection module 1202, the enterprise classification/detection module 1220 may consider the data in set A, in combination with any amount of supplemental data in set B and any amount of supplemental data in set C.

The detection module 1220 may reevaluate an activity request involving one service by processing the corresponding activity request data, in conjunction with supplemental data related to another service, in order to classify the requested activity. This processing may occur while the request is still pending and the activity—whether an event, login, address change, or any other form of activity—has not yet been finalized/permitted/etc. In this case the data depicting the reevaluated request is truly requested activity data, and any classification provided by detection module 1220 may determine whether the requested activity may be processed or allowed to take place. Additionally or alternatively, the detection module 1220 may classify activity generated in response to a request for activity at some time after the requested activity has been rejected or allowed to occur. In such a situation, it may be more accurate to say that detection module 1220 classifies activity or activity data (as opposed to requested activity or activity request data), as a request no longer remains pending. Despite this distinction, this disclosure may interchangeably refer to the detection module 1220 classification process reevaluating "activity request data," "activity data," "requested activity," or "activity requests," without implying anything about the pendency of a request or whether the activity already took place.

The detection module 1220 may be implemented using a neural network which employs adaptive-learning techniques. The detection module 1220 may alternatively or additionally use any other decision-making algorithm or combination of algorithms, to include artificial intelligence or machine-learning algorithmic techniques. Furthermore, implementation of the detection module 1220 may involve semi-supervised or supervised learning features or techniques, or a combination thereof.

The detection module 1220 may be configured to classify requested activity by analyzing a collection of data which, in the aggregate, depicts user activity involving more than one service. Moreover, the detection module 1220 may be configured to flexibly analyze various combinations of data. The various combinations of data may include different quantities of data observations, and different types of data. Additionally, the detection module 1220 may dynamically select analytic methods or combinations of methods depending on the breadth of data, the services or activities which the data relates to, or the informational content provided by the data.

For example, the detection module 1220 may be configured to classify a single instance of requested control device activity by collectively analyzing data depicting the requested activity and data depicting numerous or only a few checking database events completed by the user. The control device requested activity data could include data components not found within the checking database data, and vice versa. For instance, control device requested activity data could include information identifying an entity connected to the requested activity, while the checking database data could include information depicting an database access machine location connected with database activity, or information depicting whether activity was conducted via telephone or in person.

As one example of module classification flexibility, the same detection module 1220 may also be configured to collectively analyze data depicting an instance of requested control device activity by analyzing data depicting that request, in combination with a large corpus of data depicting many instances of past control device events completed by the user, a few instances of checking database events, and any number of other database events.

Pre-enterprise filter 1222, also referred to herein as pre-filter 1222, filters activity request data and resulting detection module 1202, 1204, or 1206 activity request classifications to determine which activity request data will be reevaluated by the detection module 1220. Hereinafter, when pre-filter 1222 determines that data should be evaluated (or reevaluated) by the detection module 1220, this data will be referred to as being "retained" by the pre-filter 1222. By retaining only certain activity request data for reevaluation, the pre-filter 1222 prevents the reevaluation of classifications which are very likely to have been performed correctly by detection modules 1202, 1204, or 1206. Furthermore, pre-filter 1222 may additionally function to prevent the enterprise detection module 220 from reevaluating otherwise routine requested activity which carries minimal risk for the entity.

The pre-filter 1222 may also function to prevent reevaluation of some other classifications for which a reevaluation would be unlikely to result in a changed classification. This filtering situation may arise, for example, at certain times when a detection module 1202, 1204, or 1206 outputs a score within a score range normally associated with poor detection module performance. In certain such circumstances, despite the high probability of an erroneous detection module classification, it is possible for the activity request data and/or supplemental data to be uninformative, sparse, or affected by some other factor or characteristic known to cause similarly poor detection module 1220 classification performance.

Also, when pre-filter 1222 retains requested activity data so that the detection module 1220 may reevaluate it, the pre-filter 1222 also serves to filter supplemental data so as to prevent the detection module 1220 from receiving data which is unlikely to be relevant or informative for performing the reevaluation at hand. In this way, detection module 1220 analyzes activity request data in combination with supplemental data. However, despite the higher-dimensional data space used by the detection module 1220, excessive processing and computational complexity are avoided because pre-filter 1222 effectively limits detection module 1220 operations to the classification of activity request data most susceptible to simple-efficient classification error, and ensures that the detection module 1220 analyzes only intelligently constructed sets of supplemental data.

The detection module 1220 may analyze user activity data in search of indications that the requested activity is abnormal for the user, inconsistent with and/or apparently incompatible with other activity data generated by the user's activities. When such indications are found, the detection module 1220 may estimate an inferential strength with which these indications support a hypothesis that the requested activity is unauthorized. Additionally, the detection module 1220 may further analyze the user activity data for indications that the requested activity is normal for the user, or consistent with, compatible with or explained by activity data generated by the user's activities. Once these indications are found, the detection module 1220 may estimate an inferential strength with which the indications contradict the hypothesis that the requested activity is unauthorized. The detection module 1220 may then compare the contradictory inferential strength to the supportive inferential strength, and classify the requested activity as authorized or unauthorized, based on the comparison result.

Detection module 1220 may employ any analytical method or combination of analytical methods to find indications that requested activity is abnormal for the user, inconsistent with or unexplained by other user activity data, and/or apparently incompatible with other user activity data. As one example of the many such methods which may be used for detecting requested activity which is abnormal for the user, the detection module 1220 may detect that the requested activity data indicates that the request is occurring at a time of day at which the user has infrequently initiated previous activity. As one example of the many such methods which may be used for detecting indications of inconsistent or incompatible data, the detection module 1220 may detect that the requested activity data indicates that the request is connected with a store or location suspiciously far from another store or location at which recent activity involving the user was registered.

Furthermore, detection module 1220 may employ any analytical method or combination of analytical methods to find indications that requested activity is normal for the user, consistent with and/or explained by other user activity data, and/or compatible with other user activity data. Detection module 1220 may identify indications of normal activity by ascertaining common behaviors of the user which are evidenced by the various activity data being analyzed. For example, the detection module 1220 might classify a request, originating in Beijing, China, for a checking database withdrawal from the user's database. In the course of making this classification, the detection module 1220 could analyze past control device activity for the user in order to ascertain whether the user frequently travels to Asia. If analysis of the control device data does indicate that the user frequently travels to Asia, the detection module 1220 could then determine that the control device activity data provides an indication that the requested activity is normal for the user.

One possible technique that the detection module may use to identify consistent, compatible, or explanatory information may involve analyzing independent sources of information in search of a same pattern of activity. For example, in an example scenario in which the detection module 1220 classifies a user's requested change of address associated with a database, the detection module 1220 could look for a similar requested change of address depicted by control device activity data and other database activity data. If similar address changes are detected, the detection module 1220 could determine that the other and control device information include data with which the requested activity is compatible and consistent. Additionally or alternatively, the detection module 1220 could similarly analyze data to determine whether database activity involving associated services began occurring near the supposed new address at about the time of the address change.

The following paragraphs will describe example operations of system 1200 to better explain how the previously described operational benefits are obtained. When a service is invoked (first, second, or third service) by a request for activity involving the user's identity or access information, activity request data is promptly routed through network 1201, and is inputted to the particular detection module 1202, 1204, or 1206 trained to analyze requests invoking the requested service (the "classifying detection module"). In some cases, the activity request data may include data which is unique to the service invoked by the request. For example, when the request for activity is a requested control device event, the activity request data may include a control device database number, expiration data, or user identity information provided as part of the activity request, a location (database access machine location, computer terminal IP address), and/or amount associated with the requested event, an event time, and/or any other relevant activity data.

Upon receiving the activity request invoking the user's database, the classifying detection module 1202, 1204, or 1206 accesses the user's interpretive information residing in the particular data set (A, B, or C, hereinafter the "analyzed data set") to which the classifying module has access. The classifying module 1202, 1204, or 1206 then analyzes the activity request data in light of the user interpretive information in order to classify the activity request as authorized or unauthorized, as well as to score the activity request.

If the classifying detection module 1202, 1204, or 1206 classifies the requested activity as authorized, the requested activity is permitted. If the detection module 1202, 1204, or 1206 classifies the requested activity as unauthorized, the activity request is rejected. The score is provided to the security measures decision module 1280, which may use the score and other information in the analyzed data set to determine if, in addition to the rejection of the request, stronger preliminary security measures are appropriate.

Regardless of the classification outcome, the requested activity data is also provided to the pre-filter 1222. The pre-filter 1222 filters the activity request data by determining whether the data should be reevaluated by the classification module 1220. As part of the process of making this determination, the pre-filter 1222 may access and evaluate the classification and score assigned by the classifying detection module 1202, 1204, or 1206. However, the pre-filter 1222 may also be configured to perform parallel filtering in which the classification and score is not involved in the filtering process which determines whether reevaluation of the activity request data is performed by detection module 1220.

If the pre-filter 1222 blocks reevaluation of the requested activity classification by withholding the requested activity data from the detection module 1220, the detection module 1202, 1204, or 1206 classification is maintained. The requested activity data is then stored in the particular data storage structure 1208, 1210, or 1212 that corresponds to the classifying detection module 1202, 1204, or 1206, as the case may be. Furthermore, when the requested activity data is stored, it is labeled with the classification and score so that the data may later be applied intelligently to the analysis, classification, and scoring of future requested activity, as well as retraining or future performance analysis of the detection module that generated the classification and score.

In cases in which the classifying detection module 1202, 1204, or 1206 makes an "unauthorized" classification which is maintained without reevaluation by the detection module 1220, the security measures decision module 1280 may consider the pre-filtering outcome in determining whether additional preliminary security measures should be imposed.

If the pre-filter 1222 retains the activity request data, the retained data is forwarded to the detection module 1220 so that it may generate its own classification and score. When the detection module 1220 performs its analysis, it may directly access the particular data storage structure and user interpretive data which the classifying module 1202, 1204, or 1206 used to determine its classification.

The pre-filter 1222 may employ any one or combination of several filtering methods or criteria for identifying requested activity data to retain for re-evaluation by detection module 1220. One such criteria may call for retaining all activity request data involving more than a threshold value, or requested beyond a certain distance from a user's address or at certain locations known to be associated with abnormal incidence of unauthorized or deceptive activity.

Another method may involve applying data analysis rules developed using training data. In accordance with this disclosure, any number of simple or complex rules can be applied to filtering in this way, and the rules may involve multiple variables, variable ranges, and conditions. The rules may be general rules applied to all users, or may be uniquely evaluated and chosen to be applied to specific users. For example, a complex set of rules may be appropriate for a user associated with events above a threshold amount, as good filtering performance in the case of high value users may have benefits which marginally outweigh the cost of any added computational complexity so necessitated. At the same time, a simpler set of rules may be appropriate to apply to a less-significant user database, as the savings in complexity may enable high value user databases to be more properly filtered.

Moreover, the pre-filter 1222 may alternate between using several different sets of rules, such that the filter chooses which set to use depending on which of the first, second, or third service is invoked the activity request being filtered.

Moreover, in filtering requested activity data, the pre-filter 1222 may use user interpretive data from the data storage structure 1208, 1210, or 1212 corresponding to the service invoked by the activity request. Thus, applying a filtering rule could involve evaluating activity request data in light of past activity request data invoking the same service.

Moreover, the pre-filter 1222 could filter activity request data based solely on the classification and score given to the activity request data by the classifying detection module 1202, 1204, or 1206. For example, the classification performance of any of detection modules 1202, 1204, and/or 1206 can be approximated by testing the detection module(s) using activity request training data which depicts past activity known to be unauthorized, and past activity known to be authorized. Detection module classifications and corresponding scores made during this training period can be compared with the correct activity labels. A range of scores having the highest relative frequency of association with erroneous training classifications can be determined and stored as a vulnerable score range for the detection module.

Thereafter, when system 1200 is used in production, the pre-filter references the vulnerable range of scores determined for the classifying detection module 1202, 1204, or 1206. If the classifying detection module 1202, 1204, or 1206 has scored the activity request data such that the score is within the vulnerable range, pre-filter 1222 may retain the activity request data for reevaluation by detection module 1220.

Also, before detection module 1220 commences reevaluation analysis, the pre-filter 1222 accesses supplemental data from the remaining two data sets not involved in the classifying detection module's analysis. For example, if the first detection module 1202 is the classifying detection module, the pre-filter 1222 accesses data set B and data set C, as these are the two data sets which are not accessed or used when the first detection module 1202 performs classification and scoring. The pre-filter 1222 filters the supplemental data by identifying data components of set B and set C which are expected to be informative in the reevaluation to be performed by detection module 1220. Retained components of the supplemental data are then provided to the detection module 1220.

As will be explained in greater detail in subsequent paragraphs, the pre-filter 1222 may employ any one or combination of several filtering methods for identifying informative data components. One such method may involve identifying and retaining the informative data components which are most different in view of any single criteria or combination of multiple criteria. This method may be understood with reference to an example hypothetical scenario involving pre-filtering of informative data depicting database access machine or database events. In such a situation, if the vast majority of informative data depicted large daytime database access machine activity occurring on weekends, the pre-filter could identify and retain any informative data depicting small nighttime database access machine activity on a weekday.

Alternatively or additionally, the pre-filter 1222 may evaluate the activity request data and filter the informative data so as to retain informative data components which are most consistent with the activity request data and/or components which are most inconsistent with the active request data. Informative data components which are consistent with requested activity are components that tend to indicate that the requested activity is authorized. Informative data components that are inconsistent with requested activity are components that tend to indicate that the requested activity is unauthorized.

Inconsistent supplemental information may be most informative in the case of a "false-negative" classification (e.g. when a detection module 1202, 1204, or 1206 erroneously classifies an activity request as authorized). One example of the many types of inconsistent supplemental data is data which, when considered alongside activity request data, reveals that the activity request took place at a location suspiciously far from a location at which other user activity occurred. An explanatory hypothetical example could involve reevaluation of a seemingly routine, but nonetheless unauthorized requested control device event at a department store close to the user's residence. In this case, if supplemental data were to show that one hour before the control device request, the user made an in-person checking database deposit at a branch located 2,000 miles from that residence, this information would be informative for contradicting the false-negative hypothesis that the activity request data is legitimate. Because inconsistent information may be most informative and advantageous for correcting false-negative classifications, pre-filter 1222 may be configured to most strongly favor retaining inconsistent supplemental information when a reevaluation of an authorized classification is to be performed.

Consistent supplemental information may be most informative when a "false-positive" classification (e.g. when a detection module 1202, 1204, or 1206 erroneously classifies an activity request as unauthorized) is reevaluated by the detection module 1220. An example of consistent supplemental information was previously provided in the example in which separate activity involving a user's control device, checking database, and other database occurred at locations spaced closely together, far from the user's residence. In that example scenario, the requested control device activity could appear abnormal and suspicious under simple-efficient analysis performed by a detection module 1202, 1204, or 1206. However, if the requested control device activity were classified as unauthorized by detection module 1202, 1204, or 1206, the checking and other activity data would be informative as supplemental information weighing against the hypothesis of unauthorized activity. Because consistent information may be most informative and advantageous for correcting false-positive classifications, pre-filter 1222 may be configured to most strongly favor retaining consistent supplemental information for a reevaluation of requested activity classified as unauthorized by the classifying detection module 1202, 1204, or 1206.

Pre-filter 1222 may also employ any number, combination or combinations of analytical methodologies, logical rules, and/or other procedures for retaining additional data that is consistent and/or inconsistent with activity request data. The following examples will provide only a few of the numerous ways in which a pre-filter 1222 can be configured to apply filtering logic to this end. As one example, the pre-filter 1222 can apply a time stamp analysis such that if activity request data indicates requested latenight or earlymorning activity, additional data depicting other latenight or earlymorning activity may be retained by the pre-filter. As another example, if requested activity data suggests an abnormally high use of database access machines the pre-filter 1222 may retain any additional data indicating that the user may be in a part of the world where database control devices are rarely accepted for use. Another possible filtering mechanism could involve applying value comparisons. For example, in response to requested activity data indicating an abnormally large value control device activity, the pre-filter 1222 could retain additional data indicating that the user may also be obtaining output at an abnormally high rate. Furthermore, when activity requests propose a transfer to an organization, the pre-filter 1222 can operate to filter additional data by retaining any additional data depicting a different form of transfer to the same organization or another entity similar to it, or additional data depicting cancellation of a re-occurring transfer to such an entity or organization.

Additionally, pre-filter 1222 may be configured to provide filtering of supplemental data in a manner customized to the preferences of the entity which operates system 1200. Different entities may have different relative preferences for avoiding false-positive detections, achieving true-positive detections, and minimizing the processing or computational demands entailed by operating system 1200. An entity's relative preferences may depend on its objectives, the characteristics of its clients or a host of other possible factors. For example, an entity which has experienced minimal exposure to criminal activity and which calculates that it is heavily prejudiced by false-positive detections could desire to emphasize false-positive avoidance over enhancing true-positive detection performance. For this reason, system 1200 enables the entity to input filter settings, as depicted at 1250.

Filter settings may be defined generally to all users and all events, or may be customized with respect to certain users, groups of users, and types of events. For example, an entity may input settings indicating a low tolerance for false-positives in the event of large events, and a higher-tolerance for false-positives in the event of small events.

The pre-filter 1222 may access the inputted filter settings and adjust the filtering of supplemental information based on the settings. As mentioned previously, in many cases, supplemental information that is consistent with requested activity data may be most informative when applied towards reevaluating activity requests initially classified as unauthorized (i.e., activity requests resulting in an initial classification that may be false-positive). Accordingly, when a newly inputted filter setting indicates that the entity is increasingly concerned about minimizing false-positive detections, the pre-filter 1222 modifies its analytics or heuristics so that the categorization of consistent supplemental data is liberalized.

Similarly, when an inputted filter setting indicates that the entity is increasingly concerned with enhancing true-positive detection, and is relatively unconcerned about false-positives, the pre-filter 1222 modifies its analytics or heuristics so that the categorization of inconsistent supplemental data is liberalized, and so that the categorization of consistent supplemental data is made more selective.

Figure 13:
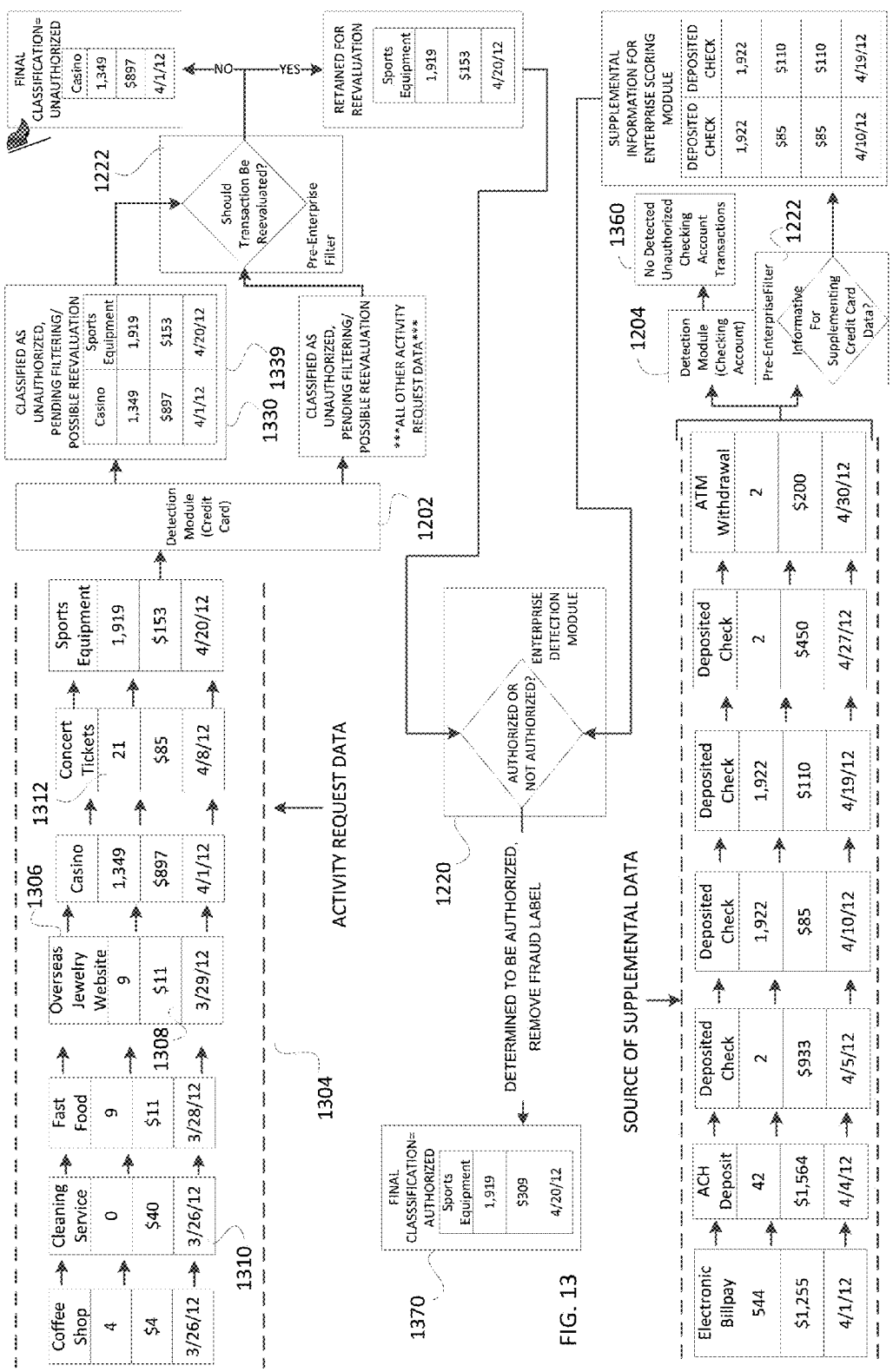
FIG. 13 illustrates generalized example operations of data filtering and activity classification in accordance with certain techniques of the present disclosure.

FIG. 13 is an exemplary and generalized depiction of pre-filtering and scoring module operations within a detection system 1200 embodying certain aspects of the present disclosure. FIG. 13 is meant only to depict only general operating characteristics and principles for explanatory purposes only, without limiting the scope of the disclosure in any way. As such, specific algorithms or analytics will not be mentioned in the following discussion of FIG. 13. Rather, the steps and outcomes in FIG. 13 are to be understood as generally illustrative of concepts and methodologies previously discussed herein. Moreover, this disclosure shall be understood to cover other detection systems 1200 having operating characteristics which may differ in any number of ways from the operating characteristics shown in FIG. 13.

As depicted in FIG. 13, when a submitted activity request invokes the user's control device database, a simple-efficient detection module 1202 (or 1204, 1206) analyzes the activity request data 1304 generated in response to the request. Detection module 1202 analyzes each instance of activity request data in conjunction with the user control device interpretive data in data set A (not shown in FIG. 13). As shown, activity request data 1304 includes a description of the organization establishment linked to the requested activity 1306. The activity request data also depicts an amount invoked by the request for activity 1308, a timestamp 1310, and an indication of the distance from the user's residence of the activity request origination location 1312.

As depicted at 1330, detection module 1202 analyzes a request for control device activity made at a casino and classifies this request as unauthorized based on the requested activity data and user control device interpretive data (not shown). Furthermore, detection module 1202 assigns a very high score 1339 to the casino control device activity request. The detection module 1202 also analyzes all other depicted control device activity requests and classifies each of these requests as authorized. The requests preliminarily classified as authorized include a request associated with a foreign website and activity request data associated with a sporting goods store. No specific depiction of these classifications is shown in the figure. Instead, the classifications of these requests as authorized is implicitly depicted by these activity requests not being shown within the "classified as unauthorized" box shown at 1330.

Pre-filter 1222 filters each instance of control device activity request data to intelligently limit the activity request data reviewed by detection module 1220. As implied by the fact that no scores are attached to the activity request data retained by pre-filter 1222, the particular pre-filter 1222 of FIG. 13 filters activity request data without considering or evaluating the scores provided by detection module 1202. That is, detection module 1202 classification and pre-filtering are independent processes. However, in other detection system implementations within the scope of the present disclosure, pre-filter 1222 may filter activity request data by considering or evaluating scores, and may even use scores as the exclusive filtering criteria.

It should be noted that in FIG. 13, pre-filter 1222 is depicted at two separate locations—once with respect to the control device data, and once with respect to the supplemental data at the bottom of the page. However, this dual depiction shall not be interpreted to mean that a pre-filter must comprise two separate or isolated parts or components. While this disclosure shall be understood to cover systems in which pre-filter is implemented using more than one processor, memory source, server, or the like, such an arrangement is only one of the many ways in which a pre-filter 1222 may be implemented in accordance with this disclosure. The dual depiction in FIG. 13 is provided only because of the ease of depicting the pre-filter in this way, and is intended only to show that the pre-filter may be applied to multiple streams of data, each of which represents activity involving a different service.

As is further depicted in FIG. 13, pre-filter 1222 filters the casino activity request data but does not retain it, thereby preventing this instance of requested activity from being evaluated by detection module 1220. However, pre-filter 1222 does retain activity request data associated with an event requested at a sports store 1,919 miles from the user's home. This request was classified as authorized by detection module 1202.

Additionally, when a submitted activity request invokes the user's checking database information, detection module 1204 analyzes the activity request data generated in response to that request. This activity request data also includes data depicting the date or time of the request, precise type of activity requested (i.e. check input, database access machine activity, etc.), the distance from the user's residence of the activity request, and the amount involved in the request. As shown at 1360, detection module 1204 classifies each of the depicted checking database activity requests as authorized.

Pre-filter 1222 filters the checking database activity request data. Here, the pre-filtering of checking database data is dual-phased. The checking database data is filtered initially to prevent inefficient detection module 1220 reevaluation of activity request data. This initial filtering is not explicitly depicted in FIG. 13. The lack of an explicit depiction is intended to imply that in the example sequence of processing operations illustrated by FIG. 13, the filtering does not result in any checking database activity request data being retained for detection module 1220 reevaluation. The requested activity data then becomes part of the user's past checking database activity, whereupon, as depicted in FIG. 13, it is again filtered to determine whether it includes informative supplemental data components for use in reevaluating control device activity request data 1304.

As depicted, pre-filter 1222 retains components depicting check input activity on Apr. 10, 2012 and Apr. 19, 2012 after determining that these components are likely to be informative for reevaluating the control device activity request involving the sports store and over seas website. Accordingly, these retained supplemental components are provided to detection module 1220.

Detection module 1220 reevaluates the requested control device activity data of Apr. 20, 2012, along with consistent supplemental data depicting the deposited checks on April 10 and Apr. 19, 2012. The information provided by the consistent supplemental data implies that the April 20 activity request may be legitimate, and detection module 1220 does ultimately classify this activity as authorized, as depicted at 1370. Because the requested activity of April 20 was initially classified as authorized by detection module 1202, no security measures were initiated in response to the initial classification. Thus FIG. 13 should be understood as implying that the Apr. 20, 2012 activity request data is simply added to the user control device interpretive data set within data storage structure 1208.

Figure 14:
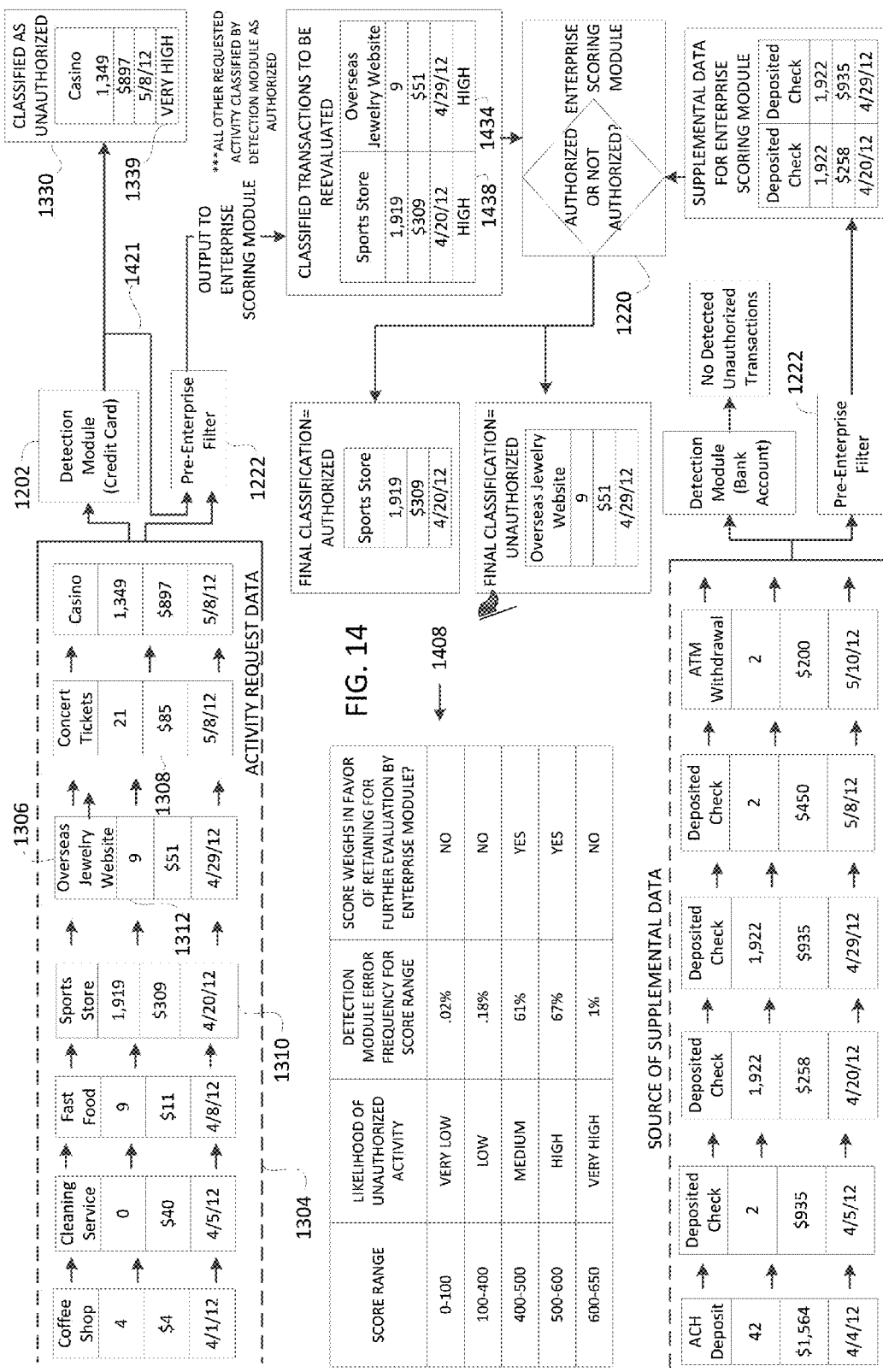
FIG. 14 depicts example procedures for classifying requested access card activity data in accordance with certain of the techniques disclosed herein.

FIG. 14 displays example operations of a detection system 1200 which operates similarly to the detection system 1200 of FIG. 13, but which has certain unique operational attributes. For example, as depicted in FIG. 14, the pre-filter 1222 evaluates detection module 1202 scores as part of filtering activity request data. This is shown by the scores 1434 and 1438, which are provided to the pre-filter 1222 via communication path 1421, and are accompanied by the activity request data to which they relate. In this arrangement, scores for activity requests classified as authorized by detection module 1202 may also be provided to, and evaluated by pre-filter 1222. However, as FIG. 14 does not specifically depict the classification results of the activity requests, the scores associated with these results are not depicted as being provided to pre-filter 1222.

As depicted in FIG. 14, the requested control device activity involving the sports store is initially classified as unauthorized by the detection module 1202. Accordingly, this requested activity is initially rejected and security measures may be imposed at the time of this initial classification. Also, FIG. 14 illustrates an example of results that may be obtained when the pre-filtering of requested activity data involves comparing the detection module 1202 scores to a scoring range within which there is a high likelihood of detection module classification error. As described previously, this type of score range may be ascertained in a training phase by using a detection module to classify and score requested activity training data with known labels.

In FIG. 14, the chart at 1408 displays examples of such score ranges for detection module 1202. As shown in the chart, classification of training data by detection module 1202 has revealed that there is significantly elevated probability of erroneous classification in the case of any requested activity triggering a medium or high detection module 1202 scoring. Also, instances of requested activity which do not trigger a score within this range are unlikely to be erroneously classified. Thus, the range of scores from 400-600 (e.g. medium-high) may be defined as the likely error range of detection module 1202.

The use of the score range for filtering may be understood with reference to the pre-filter 1222 rejection of the activity request data associated with a first entity, as compared to the pre-filter 1222 retention 1222 of the activity request data associated with a second entity. In the case of the data associated with the second entity, the pre-filter 1222 considers the high detection module 1202 score which this data triggered.

Because a high score is within the detection module 1202 likely error range, the pre-filter 1222 interprets the score as a factor weighing in favor of retaining the requested activity which triggered that score. As shown, based on both this factor as well as other considerations (i.e., other relevant logical rules, filtering parameters, heuristics, etc.), the pre-filter retains the requested activity data involving sports equipment so that it may be reevaluated by the detection module 1220.

Conversely, in the case of the data associated with the first entity, the pre-filter 1222 considers the very high detection module 1202 score that this data triggered. Because a very high score is not within the detection module 1202 likely error range, the pre-filter 1222 interprets this score as weighing against retention of the requested activity data to which it corresponds. As shown, based on this, the pre-filter 1222 rejects the requested activity data involving the first entity so that it will not be unnecessarily reclassified by the detection module 1220.

Because the requested activity data involving the first entity is not reevaluated, the initial classification is maintained. In this way, the pre-filter 1222 decision to not retain this instance of activity data is a confirmation that its initial classification by the detection module 1202 is likely to be accurate. Accordingly, additional security measures affecting the user's control device database may be activated in response to the pre-filter 1222 decision.

FIG. 14 further depicts that in response to retaining the requested control device activity data related to the sports store, the pre-filter 1222 filters the user's checking database activity data so as to identify supplemental components of this data which are likely to be informative for the detection module 1220 in reevaluating the requested control device activity data. In this process, pre-filter 1222 retains components depicting check depositing activity on Apr. 10, 2012 and Apr. 11, 2012 after determining that these components are likely to be informative for reevaluating the control device activity request involving the sports store. Accordingly, these retained supplemental components are provided to detection module 1220.

Detection module 1220 classifies the requested sports store control device activity in light of the consistent supplemental information provided by the data components depicting the check deposit on Apr. 20, 2012. Although not specifically depicted, the detection module 1220, in determining the appropriate classification, may analyze any information or data within the control device interpretive dataset stored for the user, in addition to the requested activity data, and the supplemental checking database data. As depicted, the detection module 1220, based on its analysis of multiple sources of information, determines that the requested sports store control device activity is authorized.

Because this instance of requested control device activity had previously been classified as unauthorized by detection module 1202, the module 1220 classification reverses the previous classification. For this reason, security measures decision module 1280 (not shown in FIG. 14) responds to the detection module 1220 classification by deactivating (not depicted) any security measures which were previously imposed in response to the initial detection module 1202 classification.

Detection module 1220 also reevaluates the requested control device activity data of Apr. 20, 2012, along with inconsistent supplemental data depicting the deposited check on Apr. 20, 2012. The information provided by the inconsistent supplemental data implies that the April 20 activity request may not be legitimate, and, as depicted at 1372, detection module 1220 does ultimately classify this activity as unauthorized. In response to this ultimate classification, security measures affecting at least the user's control device database may be imposed.

It should be noted that in FIG. 14, pre-filter 1222 is depicted at two separate locations—once with respect to the control device data, and once with respect to the supplemental data at the bottom of the page. However, this dual depiction shall not be interpreted to mean that a pre-filter must comprise two separate or isolated parts or components, nor that it must be implemented by separate processors or instructions stored at separate locations. While this disclosure shall be understood to cover systems in which pre-filter is implemented using more than one processor, memory source, server, or the like, such an arrangement is only one of the many ways in which a pre-filter 1222 may be implemented in accordance with this disclosure. The dual depiction in FIG. 14 is provided only because of the ease of depicting the pre-filter in this way, and is intended only to show that the pre-filter may be applied to multiple streams of data, each of which represents activity involving a different service.

Figure 15:
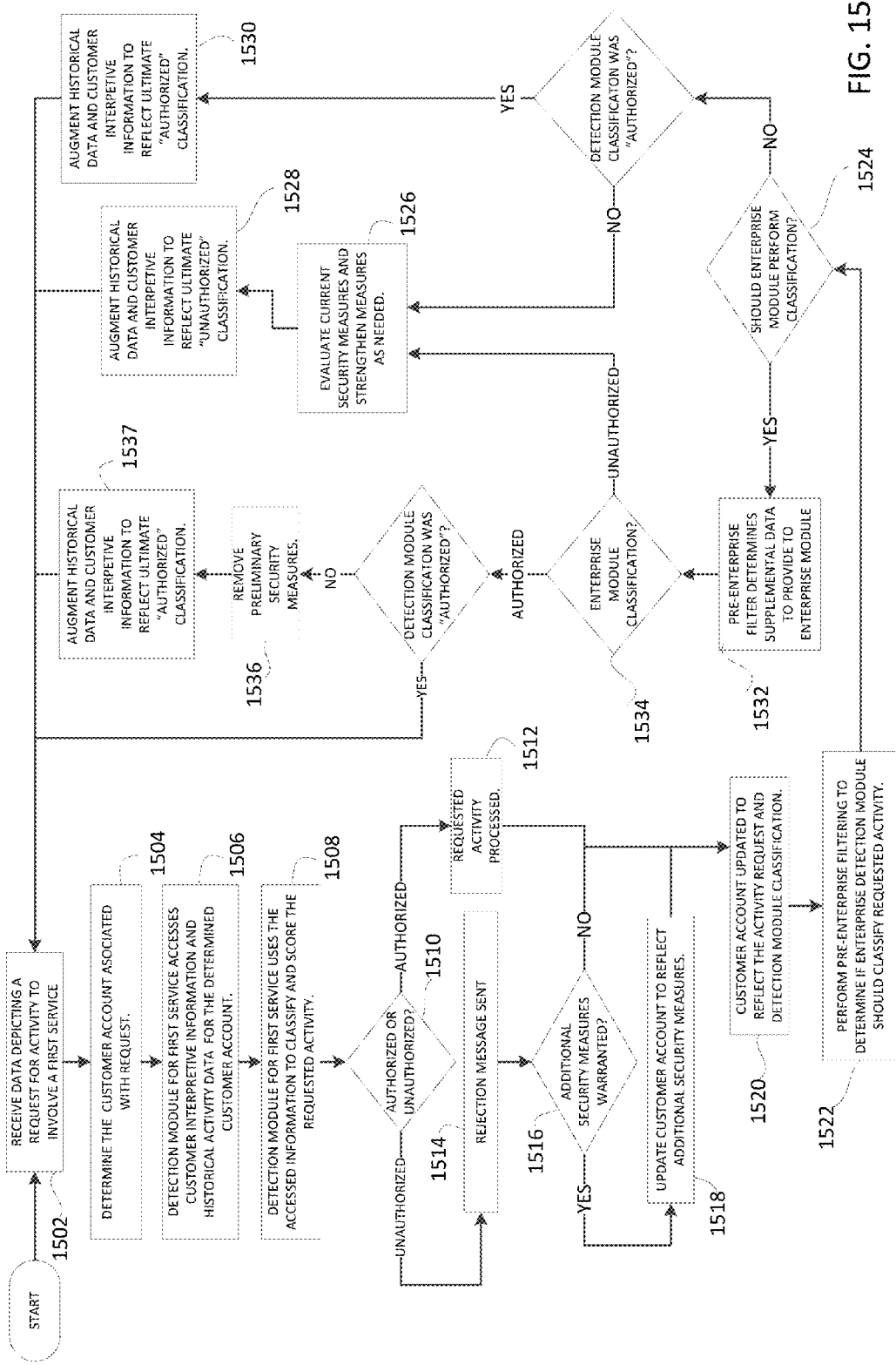
FIG. 15 is a flow chart depicting example sequences of operations and procedures executed in accordance with certain methods and techniques of the present disclosure.

FIG. 15 is a flow diagram depicting example processes of a detection system operating in accordance with the techniques of the present disclosure. The flow diagram begins at 1502, when a request for activity is received. At 1502, the depicted request is a request for activity that would involve a first service provided to a user under the monitoring of a system such as detection system 1200. At 1504, system 1200 determines the user database invoked by the request. At 1506, user interpretive information stored with respect to the database holder is accessed by a simple-efficient detection module used to classify activity requests involving the first service. The simple-efficient detection module also accesses past data depicting the usage and past activity related to the invoked database.

At 1508, the detection module uses the information accessed at 1506 in order to classify and score the request for activity received at 1502. At 1510, the process depends on the classification made by the detection module. If the request for activity is given an "authorized" classification, the requested activity is processed at 1512. Processing the requested activity may involve transmitting network communications to indicate that the requested activity has been permitted.

If, however, the request for activity is given an unauthorized classification at 1510, a rejection message is sent using network communications, as depicted at 1514. At 1516, security measures module 1280 (depicted in FIG. 12) determines whether additional preliminary security measures are appropriate. This determination may be based on the score assigned to the rejected request for activity and the average rate of erroneous detection module error associated with the score.

If it is determined that additional security measures are warranted, then at 1518, the security measures module updates the user database accessed by the rejected request so that the database reflects the additional security measures.

Regardless of whether the requested activity was classified as authorized or unauthorized, the user database invoked by the request is updated at 1520 to reflect the most recent activity request data received at 1502, and the classification made by the detection module at 1508. At 1522, the pre-filter is used to filter the activity request data. This filtering involves determining whether the detection module 1220 (depicted in FIG. 12) should be used to classify the request for activity depicted by the data.

At 1524, subsequent processes depend on the previous pre-filtering decision. If the pre-filtering decision is that module classification of the requested activity should not be performed and the detection module classification was "unauthorized," security measures module 1280 (depicted in FIG. 12) evaluates the current security measures at 1526 and strengthens them as needed. Next, at 1528, system 1200 updates the user database past data and user interpretive information to reflect that an "unauthorized" classification is ultimately assigned to the requested activity. If the pre-filtering decision is that module classification of the requested activity should not be performed and the previous detection module classification was "authorized," detection system 1200 updates the user database past data and user interpretive information to reflect that an "authorized" classification is ultimately assigned to the requested activity. This updating step is depicted at 1530.

If, at 1524, the pre-filter determines that the module should classify the requested activity, then the pre-filter additionally filters supplemental data depicting the use of a second service by the database holders associated with the first service database. The pre-filter determines a portion of this supplemental data to provide to the classification module. This filtering step is depicted at 1532.

Subsequently, at 1534, the module classification of the activity request is determined. If the classification is that the activity request is unauthorized, the security measures module 1280 evaluates the current security measures and determines if the security measures should be strengthened in light of the module classification, as depicted at 1526. Also, past data and user interpretive data associated with the user database are updated to reflect the security measures and the ultimate "unauthorized" classification, as depicted at 1528.

Alternatively, if the detection module 1220 classifies the requested activity as "authorized" at 1534, and the previous detection module 1202, 1204, or 1206 classification was "unauthorized", the security measures module 1280 deactivates the now-unnecessary security measures at 1536 and, at 1537, updates the past user activity list and interpretive information to reflect the ultimate "authorized" classification. Although in this case, it may be too late for the requested activity to be processed, the improved labeling provided by detection module 1220 may prevent unnecessary security measures from being imposed, and also prevent future incorrect classifications from being made by the detection module 1202, 1204, or 1206.

Figure 16:
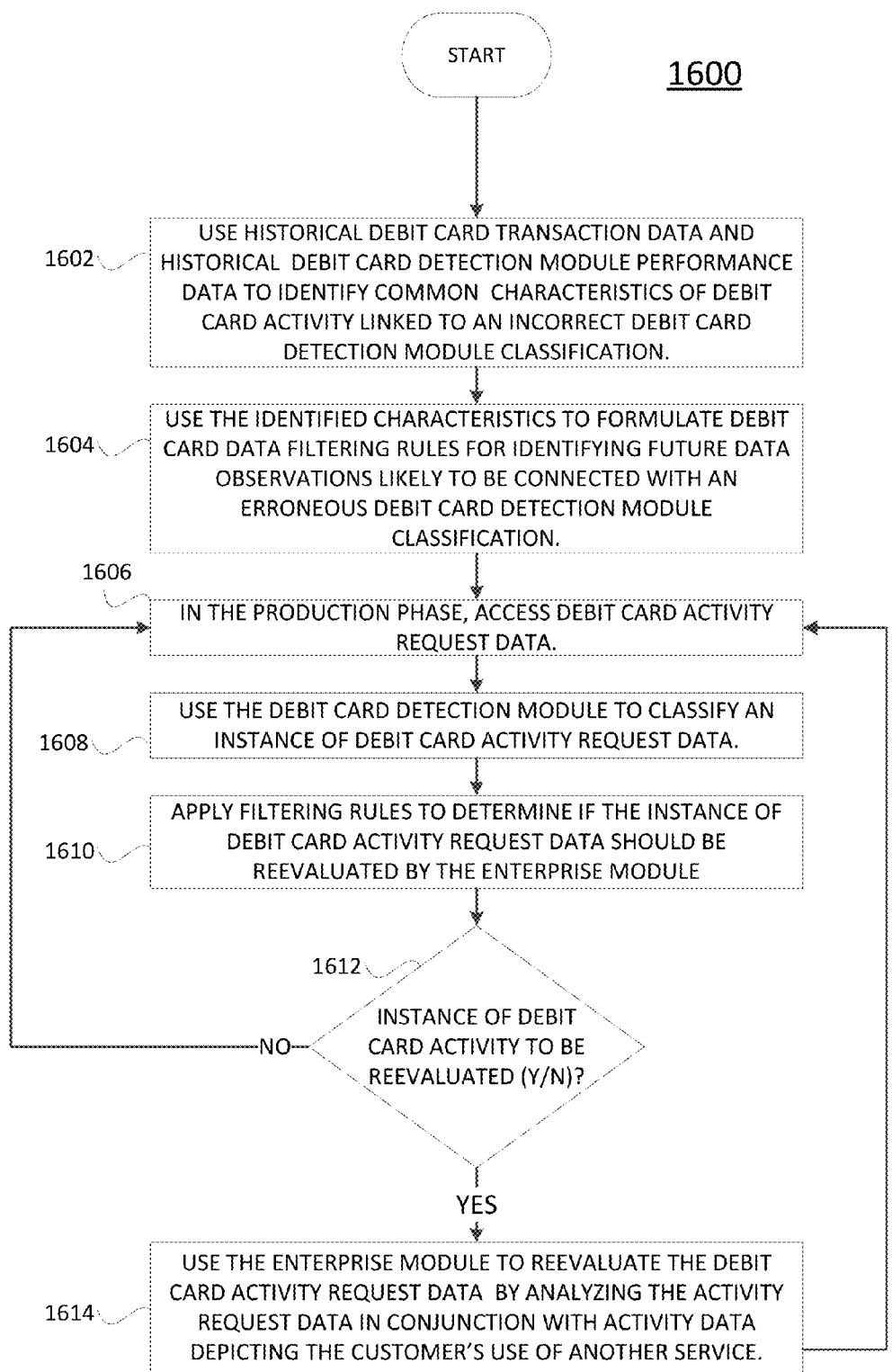
FIG. 16 is a flow chart depicting example sequences of operations and procedures executed in accordance with certain methods and techniques of the present disclosure.

FIG. 16 is an example flow diagram depicting certain generalized processes 1600 for training, implementing, and using an unauthorized activity detection system 1200 that incorporates components similar to an detection module 1220 and pre-filtering module 1222. The process of FIG. 16 may be used by an entity which utilizes a scoring module to detect unauthorized control device activity involving the database of a user who also obtains an additional service from the entity.

Process 1600, beginning at 1602, involves using past control device event data and control device detection module 1202, 1204, or 1206 performance data to identify common characteristics of control device activity linked to an incorrect control device detection module 1202, 1204, or 1206 classification. At 1604, these identified characteristics are used to formulate requested activity data filtering rules for identifying requested control device activity likely to be connected with a false control device detection module classification. One example of such a rule was discussed previously, with reference to FIG. 14, in which a detection module score range associated with relatively high probability of detection module errors was used. In the case of process 1600, the rule may provide for the retention of control device activity data which triggers a score within a certain range. The range may be ascertained in the training phase by scoring and classifying various instances of past control device activity request data, and identifying a range encompassing scores most likely to accompany an erroneous classification.

Rules for filtering control device activity may be chosen in other ways as well. For example, within a training data set, instances of past control device activity request data may be partitioned based on one or more variables. A highly-simplified partitioning will be discussed herein for exemplary and explanatory purposes. Such a partitioning may involve forming two groups of past control device activity request data such that a first group includes all data depicting requested activity involving more than a threshold amount, while the second group includes all data depicting requested activity involving less than a threshold amount. Subsequently, while still in the training phase, the control device detection module may be used to classify each instance of requested activity data in the training set. The classification performance of the detection module with respect to the first group of control device activity request data may be compared with the module's performance with respect to the second group of control device activity request data.

If the detection module classification of the data in the second group is better than its classification of the data in the first group, then the threshold may be used in a filtering rule so as to reject requested control device activity data involving less than the threshold amount. Conversely, if the detection module classification of the data in the first group is better than its classification of the data in the second group, then the threshold may be used as a filtering rule so as to reject requested control device activity data involving more than the threshold amount.

Process 1600 further includes accessing production phase control device activity request data, as shown at 1606. Subsequently, at 1608, an control device detection module (e.g. detection module 1202, 1204 or 1206) is used to classify control device activity request data. As mentioned previously, a detection module 1202, 1204 or 1206 may analyze the user control device interpretive data set (for example, the set of data stored at 1208, 1210, 1212) in the process of making each classification.

At 1610, the filtering rules determined at 1604 are applied by a pre-filter 1222. The pre-filter 1222 applies the filtering rules to the instance of control device activity request data classified at 1608. At 1610, the filtering rules enable the pre-filter 1222 to determine whether the instance of control device activity request data will be retained. This determination is indicated at 1612.

If the pre-filter retains the control device activity request data for detection module reevaluation, as indicated by the YES branching from 1612, the module reevaluates the control device activity request data by analyzing the activity request data in conjunction with activity data depicting the user's use of the additional service which the entity provides, as shown at 1614. If the pre-filter rejects the control device activity request data for detection module reevaluation as indicated by the NO branching from 1612, the process reverts again to step 1606. Subsequently, the process may continue through subsequent iterations for so long as control device activity requests from the user continue to be made.

FIG. 17 depicts an algorithm based on a more complex methodology for jointly determining supplemental data filtering rules and requested activity data filtering rules to be used by the pre-filter 1222. The joint setting of rules may be accomplished during the training phase so as to obtain a synergistic combination of rules. In accordance with the rule determination methods of FIG. 17, many candidate rule combinations may be separately tested and analyzed by operating a detection system in the training phase with the rule combinations applied. Testing a combination of filtering rules may be done by filtering the training data using the filtering rule combination, providing the retained training data components to the detection module 1220, and then analyzing the true-positive and false-positive system detection rates occasioned by application of the rule combination. Also, the computation speed and processing resources required by each rule combination may be studied. In this way, the analysis of various rule combinations may enable the selection of a combination which is anticipated to provide detection results which are consistent with the operating entity's relative preferences for true-positive detection, false-positive avoidance, and computational efficiency.

FIG. 17 shows how the joint rule selection algorithm is applied to select a combination of rules for pre-filtering of a user's control device activity request data in conjunction with pre-filtering of supplemental data depicting the user's past database access machine activity. However, the techniques, steps and processes of FIG. 17 are not limited to this particular evaluation scenario or combination of data sources. The algorithm may be easily adapted for selecting a combination of filtering rules for performing pre-data filtering of data from any number or type of user service data sources. Thus, as an one example, the depicted algorithm could be applied towards selecting a combination of rules for pre-filtering of a user's database access machine activity request data in conjunction with pre-filtering of supplemental data depicting the user's control device past activity and additional supplemental data depicting the user's past other database activity.

Moreover, any particular execution of the algorithm depicted in FIG. 17 may directed to setting pre-filtering rules for detecting unauthorized activity with respect to the database of a single user or the databases of users in a group. Thus, the algorithm depicted in FIG. 17 may be separately applied with respect to each of multiple users. In this case, an entity using detection system 1200 may execute the algorithm once for each user having a database monitored by the detection system. Each execution of the algorithm may involve using the algorithm in conjunction with past training data which is determined to be specifically relevant to the respective user.

Alternatively, a particular execution of the algorithm may be directed to setting a rule combination to be applied to the activity request data of several user databases. In this case, the entity using detection system 1200 may execute the algorithm once for the group of databases. The execution of the algorithm may be done in conjunction with past training data which is determined to be specifically relevant to the databases in the group, generally.

As depicted, algorithm 1700 involves accessing K candidate rules CCRULE$_1$, CCRULE$_2$, . . . , CCRULE$_K$} for pre-control device requested activity data filtering. These candidate rules may be filtering rules such as were described previously with regards to FIG. 16. The rules may be simple or complex, and may involve any number of conditions, logical relationships, activity data variables, or mathematical formulas. An example candidate filtering rule may be a rule which dictates retaining only instances of requested activity data connected with activity requested at a certain time of day (e.g., activity requests meeting a time of day condition involving a range of hours) and involving more than a threshold amount (e.g., activity satisfying an amount condition). Alternatively, a slightly more complex candidate rule could dictate retaining requested activity data meeting the time of day and amount conditions, and also indicating a request originating more than a threshold distance from the user's home address. Additionally, the number of rules (K) may be any number greater than one.

As depicted at 1704, the algorithm next involves accessing K candidate rules {database access machineRULE$_1$, database access machineRULE$_2$, . . . , database access machineRULE$_K$} for pre-filtering of supplemental database access machine activity data. In this step, candidate rules may be rules created in any manner, and also may incorporate any number or type of conditions, logical relationships, activity data variables, or mathematical formulas. In FIG. 17, K candidate rules are accessed both at 1702 and 1704, such that the sets of candidate rules are the same size. However, at 1704 it is also possible to determine a number of candidate rules which differs from the number of candidate rules determined at 1702.

Subsequently, at 1706, past control device training data is accessed. The control device training data may include known labels for each instance of past activity request data in the set. That is, the training data set may include only data generated in response to activity requests which were investigated and reliably determined to have been authorized or unauthorized (e.g., after classification, requests for activity often can be reliably determined to be authorized or unauthorized based on information from a subsequent investigation, user verification, entity verification, legal evidence, etc.). The training set includes information about these ultimate determinations.

The control device training data may be control device activity data previously analyzed by the particular detection module 1202, 1204, or 1206 within system 1200 that is used to analyze requested control device activity (hereinafter, for the purposes of the discussion of FIG. 17, this particular module will be referred to as the "control device detection module"). Moreover, when this is the case, each instance of the training data may be accompanied by the control device detection module classification which it triggered, and an indication as to whether the instance was ultimately determined to involve authorized or unauthorized activity.

Also, the control device training data may be chosen to include past control device activity request data deemed most relevant to the control device database(s) to be monitored using the filtering rule combination. For example, in an example scenario in which the algorithm is used to identify a rule combination which will be applied to monitoring the control device databases of particular users, the accessed control device training data may be previous activity request data which involved the databases of other related, but different, particular users. Alternatively, in a different example scenario in which the algorithm is used to identify a rule combination for use in monitoring the databases of users with a moderate output limit, the training data may be activity request data which involved the databases of other users having a similar limit.

At 1708, the performance of the control device detection module is determined with respect to the control device training data. In the case in which the training data was previously analyzed by the control device detection module, the determination may involve calculating the number of true positive classifications, true negative classifications, false positive classifications and false negative classifications. These numbers may be calculated by reviewing, for each instance of activity request training data, how the classification compared to the ultimate authorized/unauthorized determination. For example, a false positive detection is tallied in each case of an instance of activity request training data which triggered an unauthorized classification but was ultimately labeled as authorized. A true negative detection is tallied in each case of an instance of activity request training data which triggered an authorized classification and was ultimately labeled as authorized.

On the other hand, if the training data was not previously analyzed by the control device detection module, the control device detection module performance may be determined by inputting the training data set to the module so that it may classify each instance of activity request data in the set. After each instance has been classified, the classifications may be determined to be true positive, true negative, false positive, or false negative based on comparing the classifications to the authorized/unauthorized labels determined for the instances of activity request data.

Next at 1710, past training data depicting database access machine activity data is accessed. Much like the control device activity request training data, the database access machine activity data may be chosen to include past database access machine activity data deemed most relevant to analysis of the particular control device database(s) which will be monitored using the filtering rule combination.

At 1712, the testing of filtering rule combinations begins. The first step in testing rule combinations is depicted at 1714. At 1714, a first count variable (a) and a second count variable (b) are each initialized to 1. Subsequently, an iterative process begins in which different combinations of filtering rules are tested. For example, at 1716, the set of database access machine training data is filtered using database access machineRULE$_a$. Each database access machine training data component meeting the retention condition of database access machineRULE$_a$ is retained.

Next, at 1718, the set of control device activity request training data is filtered using CCRULE$_b$. Each instance of control device activity request data meeting the retention condition of CCRULE$_b$ is retained. At 1720, the retained database access machine training data components and the retained instances of control device activity request data are provided to the detection module 1220 so that the detection module may be tested in conjunction with pre-filtering based on database access machineRULE$_a$ and CCRULE$_b$. The detection module 1220 evaluates each instance of control device activity request data in light of the database access machine training data components with which it is also provided. Based on these evaluations, the detection module 1220 classifies each instance of control device activity as authorized or unauthorized. This classification process is depicted at 1722. At 1724, these detection module 1220 classifications are then individually compared to the known authorized/unauthorized labels accompanying each instance of control device activity request data in the control device training data set.

Based on these comparisons, each module classification can be recorded as either a true negative, false negative, false positive, or true positive classification. Moreover, as depicted at 1726, these results can then be saved in a data table and labeled based on the rule so that later they can be compared with the detection module classification results recorded for other rule combinations.

At 1728, the second counter variable (b) is compared to k (the number of database access machine filtering rules and the number of control device filtering rules). If b is less than k, a following iteration of steps 1718-1728 is commenced after incrementing b at 1730. Incrementing b at 1730 results in a new control device data filtering rule (CCRULE$_b$) being tested in conjunction with the previously-tested database access machine supplemental data filtering rule during the following iteration. Subsequent similar iterations of steps 1718-1728 are then progressively performed until b is not less than k (i.e., when b first equals k), at 1728.

Once b is not less than k at 1728, a is incremented and b is set equal to 1, as shown at 1732. At 1734, a is compared to k. For so long as a does not exceed k at 1734, the steps 1716-1734 are iteratively executed such that each iteration of steps 1716-1734 includes k nested iterations of steps 1718-1730, in the manner described previously. Iteratively incrementing a at 1732 enables new candidate database access machine filtering rules to be tested in combination with each candidate control device filtering rule.

When a exceeds k at 1734, every pairwise combination of control device and database access machine candidate rules has been tested. Thus, at 1736 the detection data table is analyzed to determine which rule combination was associated with the best training data detection performance. As will be explained subsequently with respect to FIG. 18, analyzing the detection table may involve considering the false-positive detection rate and true-positive detection rate indicated by the training data trials with the various rule combinations. This analysis may also involve analyzing the computational resources necessitated by each combination of rules, as well as weighing the operator's preferences for avoiding false positive detection, achieving true positive detection, and conserving computational resources.

At 1738, after a best filtering rule is identified, the filtering rule is retained for use in pre-filtering of control device activity data and supplemental database access machine activity data.

FIG. 18 depicts an example detection table 1800 provided to depict how a table may be generated during a pre-filtering rule combination trial involving training data. Specifically, FIG. 18 is intended to depict how table 1800 may be generated when the trial involves testing system 1200 using a training data set consisting of control device activity requests with known authorized/unauthorized labels, and supplemental database access machine activity data from the databases of clients' control device databases were involved in the activity requests.

The table 1800 may be understood to document results of a rule combination trial for testing the classification performance of system 1200 by separately evaluating the system's performance when using each of multiple candidate filtering rule combinations. Thus, a table such as the one depicted at 1800 may be generated by the testing process of FIG. 17, or any other similar rule combination trial involving the tabulation of detection module 1202, 1204, or 1206 pre-filter and detection module responses to multiple instances of activity request training data and supplemental data related to a first and second service, respectively.

As depicted, detection table 1800 is a tabulation of classification results obtained by separately applying each of 7 unique combinations of control device and database access machine pre-filtering rules to a pre-filter while using system 1200 to classify past requested control device activity documented by a sample of activity request training data. Although it is possible to form 9 unique combinations of the rules depicted in table 1800, only 7 such combinations have been shown for brevity. Although not depicted, it should understood that during each of the tabulated trials, the pre-filter and the detection module used supplemental database access machine activity data from the databases of users whose control device databases were involved in the control device activity requests. Each row of the table shows the distribution of classification outcomes resulting from the use of a respective rule combination in the process of classifying 6,000 instances of control device activity requests in the training data sample For example, at 1802 the table depicts a rule combination associated with the distribution of classification results in the table's bottom row. Rule combination 1802 is a combination of control device filtering rule $CCRULE_3$ and database access machine filtering Rule database access machineR- $ULE_1$. The detection data at 1852 depicts the distribution of classification outcomes resulting from using rule combination 1802 as the pre-filtering criteria during the trial classifications of the control device activity requests in the training data.

Classification category key 1854 explains and defines the classification outcome categories (A-L) used to depict the classification outcome distributions resulting from use of the evaluated rule combinations. As may be understood with reference to 1854, each classification category is a unique combination of a detection module classification result (i.e., true-positive, false-positive, true-negative, or false-negative) with respect to an analyzed request for activity, and a pre-filtering decision (i.e., module will/won't classify the activity request) with respect to the request. Furthermore, with regards to the categories (A-H) defined with respect to a pre-filtering decision to allow module classification, each of these categories is further defined with respect to an module classification result (i.e., true-positive, false-positive, true-negative, or false-negative) following the filtering. Thus, for example, category A categorizes all instances of authorized control device activity correctly classified by the control device module, but incorrectly classified by the detection module following pre-filtering of the activity request data and accompanying supplemental data. Because system 1200 operates by ultimately maintaining all classifications made by the detection module, a false positive classification is the final classification result for each classification within category A.

As an additional example, category L is defined to include all instances of control device activity known to be authorized which are incorrectly classified by the detection module, and are not classified by detection module due to a pre-filtering decision to that effect. Because system 1200 operates by maintaining all detection module classifications of requested activity for which no detection module classification is made, a false positive classification is the final classification result for each classification within category L.

Although not all of the classification categories A-L will be individually discussed beyond the explanation provided in the category key 1854 and in the discussion above, it is worth mentioning that when an evaluated rule combination is applied to classify control device activity known to have been unauthorized, the classification category must always be either category C, D, E, F, J or K, as these categories together include all of the possible ways that a false negative or true positive final detection result can occur. Alternatively, when an authorized control device event is classified by system 1200, the classification category must be either A, B, G, H, I, or L, as these categories together include all of the possible ways that a true negative or false positive final detection result can occur.

As depicted in FIG. 18, 6,000 requested control device events were depicted by the training data sample to which each filtering rule combination was applied. This fact is depicted at 1804 and 1806, which indicate that 4500 negatives (i.e., instances of authorized control device activity) and 1500 positives (i.e., instances of unauthorized control device activity) were included in the training data set (4500 negative training data samples+1500 positive training data samples=6000 total training data samples) to which the various rule combinations were applied.

The column at 1880 depicts the true positive detection rates achieved by system 1200 when the seven candidate combinations of pre-filtering rules were used. A true-positive detection rate is the percentage of positives in the sample which were correctly classified by system 1200. Thus, for any rule combination, the true-positive detection rate is computed by summing the classifications in categories C, F, and K, and dividing this sum by the total number of positives in the sample (i.e., 1500).

The false-positive detection rate is the percentage of negatives in the sample which were classified incorrectly. Thus, the false-positive detection rate is computed by summing the classifications in categories A, G, and L, and dividing this sum by the total number of negatives (i.e., 4500).

By analyzing the false positive detection rate and the true positive detection rate occasioned by each of the filtering rule combinations, an operating entity may select a filtering rule combination which can be expected to perform best in accordance with the operating entity's preferences.

Additionally, although not depicted, it may be advantageous to evaluate the computational resource consumption of the scoring module occasioned by usage of the various pre-filtering rule combinations. This evaluation may be especially desirable for an entity which intends to use the detection module to analyze activity request data for each of several different services, and thus needs to efficiently schedule resource consumption with respect to each individual service to which the module is applied. A simple way to determine an approximate resource consumption for a filtering rule combination is by determining the total number of classifications distributed among classification categories A-H. That is, the overall number of classifications performed by the detection module may be used to approximate the module's resource consumption.

FIG. 19 displays example sequences of security measure responses which may be taken by security measures module when system 1200 is used in an operational setting. As depicted in FIG. 19, in each of the example sequences, activity request data is initially classified by a detection module 1202, 1204, or 1206. If the detection module 1202, 1204, or 1206 classifies the requested activity as "authorized," the security measures module allows the requested activity to take place. If the detection module 1202, 1204, or 1206 classifies the requested activity as unauthorized, the activity is blocked and basic security measures are imposed. As depicted at 1906, pre-filter also evaluates the data generated by each activity request to determine if further evaluation and classification by the detection module 1220 is appropriate.

As depicted at 1908, when a detection module classifies a request for activity as unauthorized and pre-filter determines that further evaluation is not appropriate, the initial classification is maintained. In this case, the security measures module may impose additional security measures because the pre-filter decision provides some confirmation that the initial classification was accurately made.

Additionally, as depicted at 1910, any classifications made by the detection module are treated as the ultimate classification of system 1200. Thus, the security measures module may increase security measures to a strongest level when the module classifies an event as unauthorized.

While examples have been used to disclose the invention, including the best mode, and also to enable any person skilled in the art to make and use the invention, the patentable scope of the invention is defined by claims, and may include other examples that occur to those skilled in the art. Accordingly, the examples disclosed herein are to be considered non-limiting.

It is further noted that the systems and methods may include data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

Additionally, the methods and systems described herein may be implemented by program code comprising program instructions that are executable. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

This written description uses examples to disclose the invention, including the best mode, and also to enable a person skilled in the art to make and use the invention. The patentable scope of the invention may include other examples that occur to those skilled in the art.

The systems' and methods' data (e.g., associations, mappings, etc.) may be stored and implemented in one or more different types of computer-implemented ways, such as different types of storage devices and programming constructs (e.g., data stores, RAM, ROM, Flash memory, flat files, databases, programming data structures, programming variables, IF-THEN (or similar type) statement constructs, etc.). It is noted that data structures describe formats for use in organizing and storing data in databases, programs, memory, or other machine-readable media for use by a computer program.

The systems and methods may be provided on many different types of machine-readable media including computer storage mechanisms (e.g., CD-ROM, diskette, RAM, flash memory, computer's hard drive, etc.) that contain instructions for use in execution by a processor to perform the methods' steps and implement the systems described herein.

What is claimed is:

1. A system, comprising:
one or more processors;
one or more non-transitory computer-readable storage mediums including instructions configured to cause the one or more processors to perform operations including:
generating a filtering rule for characterizing activity data into two groups;
accessing a database including activity data to obtain training data, wherein the training data includes past activity data representing unauthorized activity;
partitioning the training data using the filtering rule, wherein partitioning includes filtering different portions of the past activity data into two partitions corresponding to the two groups;
analyzing the partitions, wherein analyzing includes providing the partitions to a model, and wherein the model generates training classifications for the past activity data;
identifying an accurate set of classifications for the training data, wherein the accurate set of classifications provides known classifications for the past activity data;
comparing the known classifications for the past activity data with the training classifications for the past activity data to evaluate performance of the model, wherein the model performs better for a first of the two partitions and worse for a second of the two partitions;
assigning a first of the two groups as a retained group and a second of the two groups as a rejected group based on the performance of the model, wherein the first of the two groups corresponds to the first of the two partitions;
accessing a first database to obtain authorized activity data that represents activity involving a first service provided to a user, wherein the first service is provided by a service provider;
accessing a second database to obtain new activity data that represents activity involving a second service provided to the user, wherein the second service is provided by the service provider, and wherein the second service is different from the first service;
generating an initial classification for the new activity data, wherein the initial classification identifies the new activity data as including authorized activity and potentially unauthorized activity data;
filtering the potentially unauthorized activity data using the filtering rule to identify retained activity data, wherein the filtering rule characterizes at least a portion of the potentially unauthorized activity data within the retained group;
filtering the authorized activity data involving the first service to identify supplemental activity data for use in classifying the retained activity data, wherein the supplemental activity data corresponds to at least a portion of the authorized activity data involving the first service that is filtered into the retained group using the filtering rule;

analyzing the retained activity data and the supplemental activity data to determine an updated classification for the retained activity data, wherein analyzing includes classifying the retained activity data as authorized activity or classifying the retained activity data as unauthorized activity;

deactivating an unnecessary security measure for the authorized activity classified from the retained activity data selecting a new security measure for the unauthorized activity classified from the retained activity data; and activating the new security measure for the authorized activity classified from the retained activity data.

2. The system of claim 1, wherein analyzing the retained activity data and the supplemental activity data includes:
determining that the supplemental activity data indicates that activity involving the first service occurred at a first location;
determining that the retained activity data indicates that activity involving the second service occurred at a second location;
determining a distance between the first location and the second location;
determining that the distance is greater than a distance threshold.

3. The system of claim 2, wherein analyzing the retained activity data and the supplemental activity data includes:
determining an approximate amount of time between the activity at the first location and the activity at the second location, wherein the retained activity data associated with the second location is classified based on the amount of time.

4. The system of claim 1, wherein analyzing the retained activity data and the supplemental activity data includes:
determining that the retained activity data represents a first instance of abnormal activity involving the second service;
detecting an inconsistency between the first instance of abnormal activity and activity represented by the authorized activity data; and
determining, based on the detected inconsistency, that the first instance of abnormal activity is unauthorized activity.

5. The system of claim 4, wherein detecting the inconsistency includes determining that the user is unlikely to have initiated both the abnormal activity and the activity represented by the authorized activity data.

6. The system of claim 1, wherein the operations further include:
determining that the retained activity data represents an instance of abnormal activity involving the second service;
detecting activity that is represented by the authorized activity data and is consistent with the instance of abnormal activity; and
in response to detecting the activity that is consistent, classifying the abnormal activity involving the second service as authorized activity.

7. The system of claim 1, wherein the supplemental activity data is a subset of the authorized activity data, and wherein the filtering rule is associated with a condition satisfied by activity data in the supplemental activity data.

8. The system of claim 7, wherein the training data corresponds to past activity data involving the second service.

9. The system of claim 1, wherein the operations further include:
determining a filtering criteria for the filtering rule based on past information associated with authorized or unauthorized activity involving the second service.

10. The system of claim 9, wherein determining the filtering criteria includes defining the filtering criteria to facilitate:
identifying a portion of the authorized activity data that is inconsistent with the new activity data; or
identifying a portion of the authorized activity data that is consistent with the new activity data.

11. The system of claim 9, wherein the operations further include:
providing the authorized activity data to a detection mechanism prior to filtering the authorized activity data, wherein:
the detection mechanism is configured to detect unauthorized activity involving the first service without processing information about user activity involving the second service.

12. The system of claim 11, wherein the detection mechanism scores components of the authorized activity data, wherein scoring includes calculating a likelihood that the scored component corresponds to unauthorized activity, and wherein filtering the authorized activity data is further based on the scoring.

13. The system of claim 1, wherein the new activity data is a subset of a data superset, wherein the data superset comprises information representing activity involving the second service, and wherein accessing the new activity data includes:
filtering the data superset, wherein filtering the data superset is performed using second data filtering criteria, and includes classifying activity represented by the new activity data.

14. The system of claim 13, wherein the second data filtering criteria are for separating a subset of data from a data superset, wherein the subset is more informative for detecting unauthorized activity as compared to a portion of data that is in the data superset but which is not in the separated subset.

15. The system of claim 1, wherein the authorized activity data represents multiple instances of activity involving the first service, wherein the authorized activity data includes multiple data components, and wherein each data component represents a unique one of the multiple instances of activity involving the first service.

16. The system of claim 15, wherein filtering the authorized activity data includes:
identifying authorized activity data components that represent:
an instance of activity associated with an amount transacted that is in excess of a predetermined threshold amount;
an instance of activity which is abnormal activity for the user;
an instance of activity determined to have occurred more than a threshold distance from a residence of the user; or
an instance of activity determined to have occurred more than a threshold distance from a location at which a previous instance of activity occurred; and wherein the supplemental activity data includes the identified authorized activity data components.

17. The system of claim 16, wherein filtering the authorized activity data is done without consideration of the new activity data.

18. The system of claim 16, wherein filtering the authorized activity data includes using a machine-learning algorithm to filter the authorized activity data, and wherein using the machine-learning algorithm includes training with past data representing unauthorized activity involving the first service or the second service.

19. A computer-implemented method for detecting an unauthorized activity, the method comprising:
   generating a filtering rule for characterizing activity data into two groups;
   accessing a database including activity data to obtain training data, wherein the training data includes past activity data representing unauthorized activity;
   partitioning the training data using the filtering rule, wherein partitioning includes filtering different portions of the past activity data into two partitions corresponding to the two groups;
   analyzing the partitions, wherein analyzing includes providing the partitions to a model, and wherein the model generates training classifications for the past activity data;
   identifying an accurate set of classifications for the training data, wherein the accurate set of classifications provides known classifications for the past activity data;
   comparing the known classifications for the past activity data with the training classifications for the past activity data to evaluate performance of the model, wherein the model performs better for a first of the two partitions and worse for a second of the two partitions;
   assigning a first of the two groups as a retained group and a second of the two groups as a rejected group based on the performance of the model, wherein the first of the two groups corresponds to the first of the two partitions;
   accessing a first database to obtain authorized activity data that represents activity involving a first service provided to a user, wherein the first service is provided by a service provider;
   accessing a second database to obtain new activity data that represents activity involving a second service provided to the user, wherein the second service is provided by the service provider, and wherein the second service is different from the first service;
   generating an initial classification for the new activity data, wherein the initial classification identifies the new activity data as including authorized activity and potentially unauthorized activity data;
   filtering the potentially unauthorized activity data using the filtering rule to identify retained activity data, wherein the filtering rule characterizes at least a portion of the potentially unauthorized activity data within the retained group;
   filtering the authorized activity data involving the first service to identify supplemental activity data for use in classifying the retained activity data, wherein the supplemental activity data corresponds to at least a portion of the authorized activity data involving the first service that is filtered into the retained group using the filtering rule;
   analyzing the retained activity data and the supplemental activity data to determine an updated classification for the retained activity data, wherein analyzing includes classifying the retained activity data as authorized activity or classifying the retained activity data as unauthorized activity;
   deactivating an unnecessary security measure for the authorized activity classified from the retained activity data
   selecting a new security measure for the unauthorized activity classified from the retained activity data; and
   activating the new security measure for the authorized activity classified from the retained activity data.

20. The method of claim 19, wherein the supplemental activity data is a subset of the authorized activity data, and wherein the filtering rule is associated with a condition satisfied by activity data in the supplemental activity data.

21. The method of claim 19, further comprising:
   determining a filtering criteria for the filtering rule based on past information associated with authorized or unauthorized activity involving the second service.

22. The method of claim 21, further comprising:
   providing the authorized activity data to a detection mechanism prior to filtering the authorized activity data, wherein:
      the detection mechanism is configured to detect unauthorized activity involving the first service without processing information about user activity involving the second service.

23. The method of claim 19, wherein the authorized activity data represents multiple instances of activity involving the first service, wherein the authorized activity data includes multiple data components, and wherein each data component represents a unique one of the multiple instances of activity involving the first service.

24. The method of claim 23, wherein filtering the authorized activity data includes:
   identifying authorized activity data components that represent:
      an instance of activity associated with an amount transacted that is in excess of a predetermined threshold amount;
      an instance of activity which is abnormal activity for the user;
      an instance of activity determined to have occurred more than a threshold distance from a residence of the user; or
      an instance of activity determined to have occurred more than a threshold distance from a location at which a previous instance of activity occurred; and
   wherein the supplemental activity data includes the identified authorized activity data components.

25. A computer-program product, tangibly embodied in a machine-readable non-transitory storage medium, including instructions configured to cause a data processing apparatus to perform operations including:
   generating a filtering rule for characterizing activity data into two groups;
   accessing a database including activity data to obtain training data, wherein the training data includes past activity data representing unauthorized activity;
   partitioning the training data using the filtering rule, wherein partitioning includes filtering different portions of the past activity data into two partitions corresponding to the two groups;
   analyzing the partitions, wherein analyzing includes providing the partitions to a model, and wherein the model generates training classifications for the past activity data;

identifying an accurate set of classifications for the training data, wherein the accurate set of classifications provides known classifications for the past activity data;

comparing the known classifications for the past activity data with the training classifications for the past activity data to evaluate performance of the model, wherein the model performs better for a first of the two partitions and worse for a second of the two partitions;

assigning a first of the two groups as a retained group and a second of the two groups as a rejected group based on the performance of the model, wherein the first of the two groups corresponds to the first of the two partitions;

accessing a first database to obtain authorized activity data that represents activity involving a first service provided to a user, wherein the first service is provided by a service provider;

accessing a second database to obtain new activity data that represents activity involving a second service provided to the user, wherein the second service is provided by the service provider, and wherein the second service is different from the first service;

generating an initial classification for the new activity data, wherein the initial classification identifies the new activity data as including authorized activity and potentially unauthorized activity data;

filtering the potentially unauthorized activity data using the filtering rule to identify retained activity data, wherein the filtering rule characterizes at least a portion of the potentially unauthorized activity data within the retained group;

filtering the authorized activity data involving the first service to identify supplemental activity data for use in classifying the retained activity data, wherein the supplemental activity data corresponds to least a portion of the authorized activity data involving the first service that is filtered into the retained group using the filtering rule;

analyzing the retained activity data and the supplemental activity data to determine an updated classification for the retained activity data, wherein analyzing includes classifying the retained activity data as authorized activity or classifying the retained activity data as unauthorized activity;

deactivating an unnecessary security measure for the authorized activity classified from the retained activity data selecting a new security measure for the unauthorized activity classified from the retained activity data; and activating the new security measure for the authorized activity classified from the retained activity data.

26. The computer-program product of claim 25, wherein the supplemental activity data is a subset of the authorized activity data, and wherein the filtering rule is associated with a condition satisfied by activity data in the supplemental activity data.

27. The computer-program product of claim 25, wherein the operations further include:

determining a filtering criteria for the filtering rule based on past information associated with authorized or unauthorized activity involving the second service.

28. The computer-program product of claim 27, wherein the operations further include:

providing the authorized activity data to a detection mechanism prior to filtering the authorized activity data, wherein:

the detection mechanism is configured to detect unauthorized activity involving the first service without processing information about user activity involving the second service.

29. The computer-program product of claim 25, wherein the authorized activity data represents multiple instances of activity involving the first service, wherein the authorized activity data includes multiple data components, and wherein each data component represents a unique one of the multiple instances of activity involving the first service.

30. The computer-program product of claim 29, wherein filtering the authorized activity data includes:

identifying authorized activity data components that represent:

an instance of activity associated with an amount transacted that is in excess of a predetermined threshold amount;

an instance of activity which is abnormal activity for the user;

an instance of activity determined to have occurred more than a threshold distance from a residence of the user; or an instance of activity determined to have occurred more than a threshold distance from a location at which a previous instance of activity occurred; and wherein the supplemental activity data includes the identified authorized activity data components.

* * * * *